United States Patent
Lin et al.

(10) Patent No.: US 12,101,796 B2
(45) Date of Patent: *Sep. 24, 2024

(54) METHOD, TERMINAL EQUIPMENT AND NETWORK EQUIPMENT FOR REPEATEDLY TRANSMITTING INFORMATION

(71) Applicant: GUANGDONG OPPO MOBILE TELECOMMUNICATIONS CORP., LTD., Guangdong (CN)

(72) Inventors: Yanan Lin, Dongguan (CN); Jing Xu, Dongguan (CN); Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 22 days.

This patent is subject to a terminal disclaimer.

(21) Appl. No.: 17/482,669

(22) Filed: Sep. 23, 2021

(65) Prior Publication Data

US 2022/0015105 A1    Jan. 13, 2022

Related U.S. Application Data

(63) Continuation of application No. 17/015,234, filed on Sep. 9, 2020, now Pat. No. 11,166,286, which is a (Continued)

(51) Int. Cl.
*H04W 72/53* (2023.01)
*H04W 72/0446* (2023.01)
(Continued)

(52) U.S. Cl.
CPC ....... *H04W 72/53* (2023.01); *H04W 72/0446* (2013.01); *H04W 72/21* (2023.01); *H04W 72/23* (2023.01); *H04W 74/0808* (2013.01)

(58) Field of Classification Search
None
See application file for complete search history.

(56) References Cited

U.S. PATENT DOCUMENTS

| | | |
|---|---|---|
| 2012/0076071 A1 | 3/2012 | Kim et al. |
| 2013/0044727 A1 | 2/2013 | Nory et al. |

(Continued)

FOREIGN PATENT DOCUMENTS

| | | |
|---|---|---|
| CN | 107079231 A | 8/2017 |
| CN | 107615726 A | 1/2018 |

(Continued)

OTHER PUBLICATIONS

First Office Action dated Sep. 10, 2021 in China App. CN202010780953.X, with English translation.

(Continued)

*Primary Examiner* — Jamaal Henson
(74) *Attorney, Agent, or Firm* — PERKINS COIE LLP

(57) ABSTRACT

Disclosed by the present disclosure are a method, terminal device and network device for repeatedly transmitting information, the method comprising: on continuous time-domain resources of at least one continuous time slot, transmitting K uplink transmission channels which are used for independent transmission of target data, wherein K is an integer greater than or equal to 2, and the transmission of K uplink transmission channels on continuous time-domain resources comprises: when remaining time-domain resources of an m-th slot cannot carry an entire n-th uplink transmission channel, transmitting the n-th uplink transmission channel in the m+1-th slot, or, transmitting the incomplete n-th uplink transmission channel in the remaining time-domain resources of the m-th slot, wherein n is an integer greater than or equal to 1 and less than or equal to k, and m is an integer greater than or equal to 1.

12 Claims, 6 Drawing Sheets

Related U.S. Application Data continuation of application No. PCT/CN2018/110143, filed on Oct. 12, 2018.

(51) Int. Cl.
*H04W 72/21* (2023.01)
*H04W 72/23* (2023.01)
*H04W 74/0808* (2024.01)

(56) References Cited

U.S. PATENT DOCUMENTS

| | | |
|---|---|---|
| 2013/0188583 A1 | 7/2013 | Lan et al. |
| 2014/0241310 A1 | 8/2014 | Guan |
| 2016/0050667 A1* | 2/2016 | Papasakellariou ............... H04W 52/0251 370/329 |
| 2016/0157223 A1 | 6/2016 | Nogami et al. |
| 2016/0269146 A1 | 9/2016 | Sun et al. |
| 2016/0286579 A1 | 9/2016 | Park et al. |
| 2016/0309355 A1 | 10/2016 | Seo et al. |
| 2016/0337839 A1 | 11/2016 | Chae et al. |
| 2017/0027011 A1 | 1/2017 | Chae et al. |
| 2017/0187494 A1* | 6/2017 | Tirronen ............... H04L 1/1896 |
| 2018/0019836 A1 | 1/2018 | Kim et al. |
| 2018/0054253 A1 | 2/2018 | Seo |
| 2018/0115981 A1 | 4/2018 | Kim et al. |
| 2018/0288795 A1 | 10/2018 | Zhang et al. |
| 2018/0324861 A1 | 11/2018 | Oh et al. |
| 2018/0375619 A1 | 12/2018 | Hwang et al. |
| 2018/0375710 A1 | 12/2018 | Chae |
| 2019/0044649 A1 | 2/2019 | Kim et al. |
| 2019/0045533 A1* | 2/2019 | Chatterjee ............... H04W 72/23 |
| 2019/0082456 A1 | 3/2019 | Kim et al. |
| 2019/0296809 A1* | 9/2019 | Li ............... H04W 72/20 |
| 2019/0313436 A1* | 10/2019 | Lee ............... H04L 5/0051 |
| 2020/0008216 A1 | 1/2020 | Iyer et al. |
| 2020/0106559 A1* | 4/2020 | Vilaipornsawai ..... H04L 1/1896 |
| 2020/0146032 A1* | 5/2020 | Bae ............... H04L 1/1819 |
| 2021/0045110 A1* | 2/2021 | Fröberg Olsson ............... H04W 72/0446 |
| 2022/0061067 A1* | 2/2022 | Andersson ........ H04W 72/1263 |
| 2023/0070829 A1* | 3/2023 | Fröberg Olsson ........ H04L 1/08 |

FOREIGN PATENT DOCUMENTS

| | | |
|---|---|---|
| CN | 107995636 A | 5/2018 |
| CN | 108243457 A | 7/2018 |
| CN | 108623036 A | 10/2018 |
| CN | 108631960 A | 10/2018 |
| CN | 108633036 A | 10/2018 |
| RU | 2585983 C2 | 6/2016 |
| WO | 2017105158 A1 | 6/2017 |
| WO | 2017160100 A2 | 9/2017 |
| WO | 2018171737 A1 | 9/2018 |
| WO | 2018175420 A1 | 9/2018 |
| WO | 2019207488 A1 | 10/2019 |
| WO | WO-2020067967 A1 * | 4/2020 ........... H04L 5/0012 |
| WO | WO-2020069416 A1 * | 4/2020 ........ H04W 72/1273 |

OTHER PUBLICATIONS

R1-1705751, 3GPP TSG RAN WG1 Meeting #88bis, Low latency uplink for URLLC, Spokane, USA Apr. 3-7, 2017.
Advisory Action, issued May 3, 2021 of U.S. Appl. No. 17/015,234, filed Sep. 9, 2020., May 3, 2021.
Corrected Notice of Allowability, issued Jul. 7, 2021 of U.S. Appl. No. 17/015,234, filed Sep. 9, 2020. 11 pages., Jul. 7, 2021, 11 pp.
Final Office Action, issued Feb. 25, 2021 of U.S. Appl. No. 17/015,234, filed Sep. 9, 2020., Feb. 25, 2021.
First Office Action, dated Sep. 10, 2021 in China App. CN202010780953.X, with English translation, Sep. 10, 2021, 14 pp.
International Search Report, mailed May 15, 2019 of PCT/CN2018/110143 (4 pages)., May 15, 2019, 4 pp.
Non-Final Office Action, issued Nov. 9, 2020 of U.S. Appl. No. 17/015,234, filed Sep. 9, 2020., Nov. 9, 2020.
Notice of Allowance, issued Jun. 15, 2021 of U.S. Appl. No. 17/015,234, filed Sep. 9, 2020., Jun. 15, 2021.
EPO , Extended European Search Report, for European Patent Application No. 18936742.8. Mail Date: Apr. 6, 2021. 15 pages., Apr. 6, 2021, 15 pp.
Intel Corporation , "Remaining issues of UL transmission procedures", 3GPP TSG RAN WG1 Meeting #92, R1-1802416, Athens, Greece, Feb. 26-Mar. 2, 2018., Feb. 26, 2018.
IPA , Examination Report No. 1, for Australian Patent Application No. 2018444829. Mail Date: Apr. 13, 2021. 4 pages., Apr. 13, 2021, 4 pp.
LG Electronics Inc. , "Discussion on Enhancement for Grant-free Transmission", RI-1808533, Aug. 11, 2018 (Aug. 11, 2018), parts 4-6 (7 pages)., Aug. 11, 2018, 7 pp.
Nokia , et al., "R1-1810662", 3GPP TSG RAN WG1 Meeting #94bis, R1-1810662, Chengdu, China, Oct. 8-12, 2018,On Configured Grant enhancements for NR URLLC, Oct. 8, 2018.
NTT Docomo, Inc. , "R1-1705751", 3GPP TSG RAN WG1 Meeting #88bis, Low latency uplink for URLLC, R1-1705751, Spokane, USA Apr. 3-7, 2017, Apr. 7, 2017, 4 pp.
Rospatent , Decision to Grant a Patent, for Russian Patent Application No. 2020136524. Mail Date: Mar. 25, 2021. 22 pages with English translation., Mar. 25, 2021, 22 pp.
Samsung , Potential Enhancement for UL Grant-free Transmission, RI-1808789, Aug. 11, 2018 (Aug. 11, 2018), part 3 (4 pages)., Aug. 11, 2018, 4 pp.
ZTE , Enhanced UL Grant-free Transmissions, RI-1808213, Aug. 11, 2018 (Aug. 11, 2018), part 3 (6 pages)., Aug. 11, 2018, 6 pp.
Decision on Registration for Korean Application No. 10-2020-7030668 issued Jul. 25, 2022. 4 pages with English translation.
Examination Report for European Application No. 18936742.8 issued Jun. 10, 2022. 7 pages.
Notice of Reasons for Refusal for Japanese Application No. 2021-504556 issued Aug. 5, 2022. 6 pages with English translation.
Examination Report for European Application No. 18936742.8 issued Jan. 3, 2022. 9 pages.
Examination Report for Indian Application No. 202027044802 issued Dec. 28, 2021. 6 pages with English translation.
Examiner's Report for Canadian Application No. 3,097,223 issued Nov. 3, 2021. 5 pages.
Nokia et al. "On scheduled PUSCH (& PDSCH) repetition enhancements for NR URLLC" 3GPP TSG RAN WG1 Meeting #94bis R1-1810669; Chengdu, China, Oct. 8-12, 2018. 5 pages.
Notice of Reasons for Refusal for Japanese Application No. 2021-504556 issued Dec. 24, 2021. 12 pages with English translation.
Notification of Reason for Refusal for Korean Application No. 10-2020-7030668 issued Jan. 3, 2022. 10 pages with English translation.
NTT Docomo, Inc. "Physical Layer Enhancements for NR URLLC" 3GPP TSF RAN WG1 Meeting #94 R1-1809163; Gothenburg, Sweden, Aug. 20-24, 2018. 15 pages.
Second Office Action for Chinese Application No. 202010780953.X issued Nov. 11, 2021. 16 pages with English translation.
USPTO, Corrected Notice of Allowability for U.S. Appl. No. 17/015,234. Mail Date: Sep. 30, 2021. 4 pages.
Extended European Search Report for European Application No. 22211742.6 issued Jan. 25, 2023. 13 pages.
Written Opinion for Singapore Application No. 11202010084R issued Nov. 25, 2022. 10 pages.
Hearing Notice of Indian application No. 202027044802 issued on Jul. 13, 2023, 3 pages.

* cited by examiner

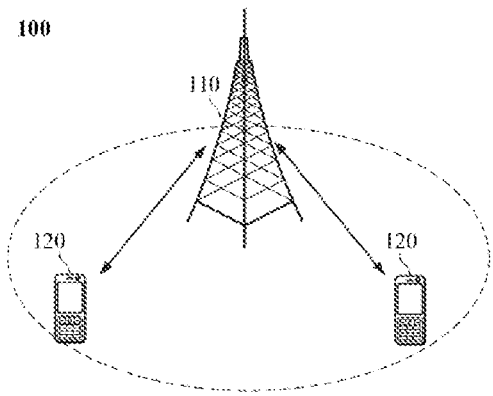
FIG. 1
K uplink transmission channels are transmitted in continuous time domain resources of at least one continuous slot; wherein the K uplink transmission channels are used for independently transmitting target data; K is an integer greater than or equal to 2
FIG. 2
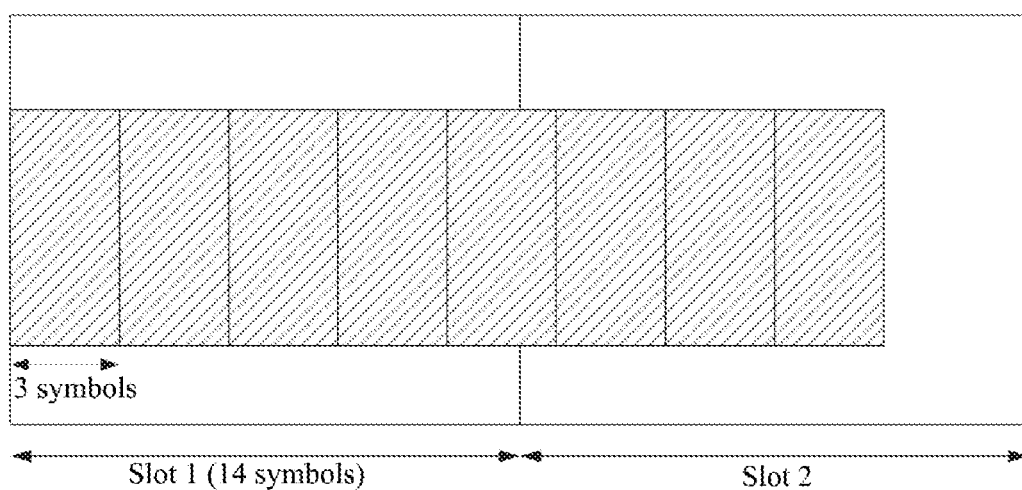
FIG. 3

K downlink transmission channels are transmitted in continuous time domain resources of at least one continuous slot; wherein the K downlink transmission channels are used for independently transmitting target data; K is an integer greater than or equal to 2 — 901

First communication unit 1001

Second communication unit 1101

METHOD, TERMINAL EQUIPMENT AND NETWORK EQUIPMENT FOR REPEATEDLY TRANSMITTING INFORMATION

CROSS-REFERENCE TO RELATED APPLICATION

This application is a continuation application of the application Ser. No. 17/015,234, filed on Sep. 9, 2020, which is a continuation of International Application No. PCT/CN2018/110143 filed Oct. 12, 2018, the entire contents of which are incorporated herein by reference.

TECHNICAL FIELD

The present disclosure relates to the technical field of information processing, in particular to a method for repeatedly transmitting information, a terminal device, a network device, a chip, a computer readable storage medium, a computer program product, and a computer program.

BACKGROUND

Grant free spectrum is a spectrum divided by countries and regions and may be used for radio device communication. The spectrum is usually considered as a shared spectrum, that is, communication devices in different communication systems may use the spectrum as long as they meet regulatory requirements of the spectrum set by countries or regions, without applying to the government for exclusive spectrum grant. With a development of wireless communication technology, a LTE system and NR system will consider laying out networks on grant free spectrum to use the grant free spectrum for implementing transmission of data service. The current 5G new radio system introduces Ultra-reliable low latency communication (URLLC), which is characterized by realizing ultra-high reliability transmission within an extreme latency. In order to achieve this goal, a concept of Grant free is proposed. Grant free adopts a preconfigured/semi-persistent resource configuration mode, and a terminal may transmit in a configured resource according to a service requirement. In order to improve a transmission performance, grant free supports the repeated transmission, but a related design of current Rel-15 grant free is not very suitable for transmitting grant free data in grant free spectrum, thus reducing a success ratio of transmission.

SUMMARY

The implementations of the present disclosure provide a method for repeatedly transmitting information, a terminal device, a network device, a chip, a computer readable storage medium, a computer program product, and a computer program.

In a first aspect, an implementation of the present disclosure provides a method for repeatedly transmitting information, which is applied to a terminal device, including: transmitting K uplink transmission channels in continuous time domain resources of at least one continuous slot; wherein the K uplink transmission channels are used for independently transmitting target data; K is an integer greater than or equal to 2; wherein, the transmitting K uplink transmission channels in continuous time domain resources of at least one continuous slot includes: transmitting a n-th uplink transmission channel in a m+1-th slot when remaining time domain resources of a m-th slot cannot carry a complete n-th uplink transmission channel; or transmitting an incomplete n-th uplink transmission channel in the remaining time domain resources of the m-th slot when the remaining time domain resources of the m-th slot cannot carry a complete n-th uplink transmission channel; wherein n is an integer greater than or equal to 1 and less than or equal to K, and m is an integer greater than or equal to 1.

In a second aspect, an implementation of the present disclosure provides a method for repeatedly transmitting information, which is applied to a network device, including: transmitting K downlink transmission channels on continuous time domain resources of at least one continuous slot; wherein the K downlink transmission channels are used for independently transmitting target data; K is an integer greater than or equal to 2; wherein the transmitting K downlink transmission channels in continuous time domain resources of at least one continuous slot includes: transmitting the n-th uplink transmission channel in the m+1-th slot when remaining time domain resources of the m-th slot cannot carry a complete n-th uplink transmission channel; or transmitting the incomplete n-th uplink transmission channel in the remaining time domain resources of the m-th slot when the remaining time domain resources of the m-th slot cannot carry a complete n-th uplink transmission channel; wherein n is an integer greater than or equal to 1 and less than or equal to K, and m is an integer greater than or equal to 1.

In a third aspect, an implementation of the present disclosure provides a terminal device, including: a first communication unit, configured to transmit K uplink transmission channels on continuous time domain resources of at least one continuous slot; wherein the K uplink transmission channels are used for independently transmitting target data; K is an integer greater than or equal to 2; wherein the first communication unit is configured to transmit the n-th uplink transmission channel in the m+1-th slot when remaining time domain resources of the m-th slot cannot carry a complete n-th uplink transmission channel; or transmit the incomplete n-th uplink transmission channel in the remaining time domain resources of the m-th slot when the remaining time domain resources of the m-th slot cannot carry a complete n-th uplink transmission channel; wherein n is an integer greater than or equal to 1 and less than or equal to K, and m is an integer greater than or equal to 1.

In a fourth aspect, an implementation of the present disclosure provides a network device, including: a second communication unit, configured to transmit K downlink transmission channels in continuous time domain resources of at least one continuous slot; wherein the K downlink transmission channels are used for independently transmitting target data; K is an integer greater than or equal to 2; wherein, the transmission of K downlink transmission channels on continuous time domain resources of at least one continuous slot includes: transmitting the n-th uplink transmission channel in the m+1-th slot when remaining time domain resources of the m-th slot cannot carry a complete n-th uplink transmission channel; or transmitting the incomplete n-th uplink transmission channel in the remaining time domain resources of the m-th slot when the remaining time domain resources of the m-th slot cannot carry a complete n-th uplink transmission channel; wherein n is an integer greater than or equal to 1 and less than or equal to K, and m is an integer greater than or equal to 1.

In a fifth aspect, an implementation of the present disclosure provides a terminal device, including a processor and a memory. The memory is configured to store a computer program, and the processor is configured to call and run the computer program stored in the memory to execute the method in the first aspect or various implementations thereof.

In a sixth aspect, a network device is provided, including a processor and a memory. The memory is configured to store a computer program, and the processor is configured to call and run the computer program stored in the memory to execute the method in the second aspect or various implementations thereof.

In a seventh aspect, a chip is provided for implementing any one method in the first to second aspects or various implementations thereof.

Specifically, the chip includes a processor, configured to call and run a computer program from a memory, so that a device on which the chip is installed performs any one method in the first to second aspects or various implementations thereof.

In an eighth aspect, a computer readable storage medium is provided for storing a computer program that enables a computer to perform any one method in the first to second aspects or various implementations thereof.

In a ninth aspect, a computer program product is provided, including computer program instructions that enable a computer to perform any one method in the first to second aspects or various implementations thereof.

In a tenth aspect, a computer program is provided, when running on a computer, enables the computer to perform any one method in the first to second aspects or various implementations thereof.

BRIEF DESCRIPTION OF DRAWINGS

FIG. 1 is a first schematic diagram of architecture of a communication system provided by an implementation of the present application.

FIG. 2 is a first schematic flow chart of a method for repeatedly transmitting information provided by an implementation of the present application.

FIG. 3 is a first schematic diagram of a scenario in which information is repeatedly transmitted in a slot provided by an implementation of the present disclosure.

DETAILED DESCRIPTION

Figure 4:
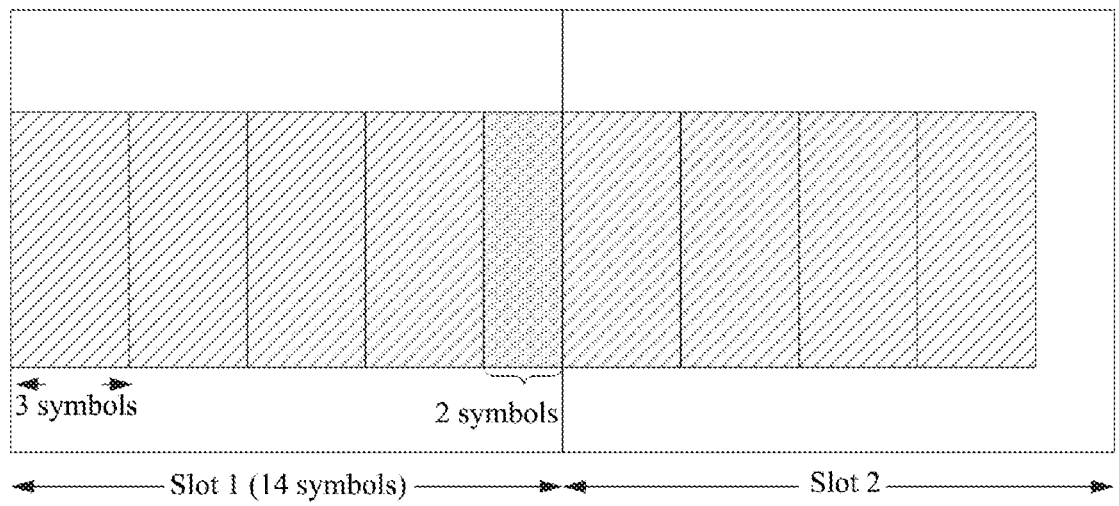
FIG. 4 is a second schematic diagram of a scenario in which information is repeatedly transmitted in a slot provided by an implementation of the present application.

Hereinafter, technical solutions in implementations of the present application will be described with reference to accompanying drawings in the implementations of the present application. It is apparent that the implementations described are just some implementations of the present application, but not all implementations of the present application. According to the implementations of the present application, all other implementations achieved by a person of ordinary skill in the art without paying an inventive effort are within the protection scope of the present application.

The technical solutions of the implementations of the present application may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system, a Fifth-Generation (5G) system and the like.

Illustratively, the communication system 100 to which the implementations of the present application are applied may be as shown in FIG. 1. The communication system 100 may include a network device 110, which may be a device that communicates with a terminal device 120 (or called a communication terminal, a terminal). The network device 110 may provide communication coverage for a specific geographical area and may communicate with terminal devices located within the coverage area. Optionally, the network device 110 may be a Base Transceiver Station (BTS) in a GSM system or CDMA system, a NodeB (NB) in a WCDMA system, or may be an Evolutional Node B (eNB or eNodeB) in an LTE system, or a radio controller in a Cloud Radio Access Network (CRAN). Or the network device may be a mobile switching center, a relay station, an access point, a vehicle device, a wearable device, a hub, a switch, a network bridge, a router, a network side device in a 5G network, or a network device in a future evolved Public Land Mobile Network (PLMN), etc.

The wireless communication system 100 also includes at least one terminal device 120 located within a coverage area of the network device 110. As used herein, "a terminal device" includes, but is not limited to, connection via a wired line, such as via a public switched telephone network (PSTN), a Digital Subscriber Line (DSL), a digital cable, a direct cable connection; and/or another data connection/network; and/or via a wireless interface such as, for example, a cellular network, a Wireless Local Area Network (WLAN), a digital television network such as a DVB-H network, a satellite network, an AM-FM broadcast transmitter; and/or another terminal device configured to receive/send a communication signal; and/or Internet of Things (IoT) devices. A terminal device configured to communicate through a wireless interface may be referred to as "a wireless communication terminal", "a wireless terminal" or "a mobile terminal". Examples of a mobile terminal include, but are not limited to, a satellite phone or a cellular phone; a Personal Communications System (PCS) terminal that may combine a cellular radio phone with data processing, fax and data communication capability; or a PDA including a radiotelephone, pager, Internet/Intranet access, Web browser, notebook, calendar, and/or a Global Positioning System (GPS) receiver; as well as conventional laptop and/or palmtop receiver or other electronic apparatus including radiotelephone transceivers. The terminal device may be referred to as an access terminal, a User Equipment (UE), a subscriber unit, a UE station, a subscriber station, a mobile station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle device, a wearable device, a terminal device in a 5G network, or a terminal device in a future evolved Public Land Mobile Network (PLMN), or the like.

Optionally, a Device to Device (D2D) communication may be performed between the terminal devices 120.

Optionally, a 5G system or network may also be referred to as a New Radio (NR) system or network.

FIG. 1 exemplifies one network device and two terminal devices. Optionally, the wireless communication system 100 may include multiple network devices, and another quantity of terminal devices may be included within the coverage area of each network device, and implementations of the present application are not limited to thereto.

Optionally, the wireless communication system 100 may further include other network entities such as a network controller, a mobile management entity, and implementations of the present application are not limited to thereto.

It should be understood that a device with communication functions in the network/system in implementations of the present application may be referred to as a communication device. Taking the communication system 100 shown in FIG. 1 as an example, the communication device may include a network device 110 and terminal device 120 having a communication function, and the network device 110 and the terminal device 120 may be the specific devices described above, which will not be described here again. The communication device may also include other device in the communication system 100, such as a network controller, a mobile management entity, and other network entity, and implementations of the present application are not limited to thereto.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "I" in this document generally indicates that objects before and after the symbol "I" have an "or" relationship.

To understand features and technical contents of implementations of the present disclosure in more detail, the implementation of the implementations of the present disclosure will be described in detail below with reference to the drawings, which are used for reference only and are not intended to limit the implementations of the present disclosure.

Implementation One

An implementation of the present disclosure provides a method for repeatedly transmitting information, applied to a terminal device, as shown in FIG. 2. The method includes act 201.

In act 201: K uplink transmission channels are transmitted in continuous time domain resources of at least one continuous slot; wherein the K uplink transmission channels are used for independently transmitting target data; K is an integer greater than or equal to 2; wherein the K uplink transmission channels are transmitted in continuous time domain resources of at least one continuous slot, including: the n-th uplink transmission channel is transmitted in the m+1-th slot when remaining time domain resources of the m-th slot cannot carry a complete n-th uplink transmission channel; or, the incomplete n-th uplink transmission channel is transmitted in the remaining time domain resources of the m-th slot when the remaining time domain resources of the m-th slot cannot carry the complete n-th uplink transmission channel; wherein n is an integer greater than or equal to 1 and less than or equal to K, and m is an integer greater than or equal to 1.

The continuous time domain resources may be continuous time domain symbols. The uplink transmission channel may be a Physical Uplink Shared Channel (PUSCH).

In the K uplink transmission channels, the time domain resources occupied by each uplink transmission channel are less than the quantity of time domain resources contained in one slot. For example, a slot may have 14 symbols, so the time domain resources occupied by an uplink transmission channel, i.e. the quantity of time domain symbols occupied is less than 14 symbols, may be 3 symbols.

In this implementation, the K uplink transmission channels repeatedly transmit identical content for K times; or, different transmission versions of same target data are carried in different uplink transmission channels in the K uplink transmission channels.

Specifically, the K uplink transmission channels are used for repeatedly transmitting the target data, which may be identical content, and the content may be the target data, or, may be target data of same transmission version; or, the K uplink transmission channels transmit the same target data but adopt different transmission versions.

Different transmission versions may be understood as same original information, that is, the same target data, but the encoded information is not identical. When the same content is transmitted, the same transmission block (TB) may be transmitted.

The following describes this implementation in various scenarios.

Scenario 1: K uplink transmission channels may be transmitted in continuous time domain resources of at least one continuous slot; that is, the K uplink transmission channels are continuously transmitted on continuous symbols of multiple continuous slots.

For example, referring to FIG. 3, assuming that the target data is repeated K=8 times, one physical channel PUSCH occupies N=3 time domain symbols, one slot contains the quantity of time domain symbols L=14, and at least one continuous slot is slot 1 and slot 2 respectively. Continuously transmitting K uplink transmission channels, i.e. the terminal device determines 8 PUSCHs according to a time sequence from a start symbol of the slot 1 until a transmission of the K uplink transmission channels is completed.

Scenario 2: when the remaining time domain resources of the slot are not sufficient to carry a complete uplink transmission channel, the uplink transmission channel may not be transmitted in the part of remaining time domain resources. The following processing modes specifically exist:

Mode 1: when the remaining time domain resources of the m-th slot cannot carry the complete n-th uplink transmission channel, the n-th uplink transmission channel is transmitted in the m+1-th slot, including: when the remaining time domain resources of the m-th slot cannot carry the complete n-th uplink transmission channel, the n-th uplink transmission channel is started to be transmitted at a starting position of the m+1-th slot. At this time, the n-th uplink transmission channel may not be transmitted in the remaining time domain resources.

Taking the uplink transmission channel as a physical channel PUSCH as an example, as shown in FIG. 4, currently there are two slots, slot 1 and slot 2. The target data is repeated K=8 times, one physical channel PUSCH occupies N=3 time domain symbols, and the slot contains the quantity of time domain symbols L=14. The terminal determines the time domain resources of various PUSCHs according to a time sequence from a start symbol. For the fifth PUSCH, since only 2 time domain symbols remain in the slot 1, which is not sufficient to carry a complete PUSCH, the fifth PUSCH is transmitted from a starting position of the slot 2.

Mode 2: when the remaining time domain resources of the m-th slot cannot carry the complete n-th uplink transmission channel, the n-th uplink transmission channel is transmitted in the m+1-th slot, including: when the remaining time domain resources of the m-th slot cannot carry the complete n-th uplink transmission channel and the remaining resources meet a first agreed condition, the n-th uplink transmission channel is transmitted at a starting position of the m+1-th slot.

At this time, it can also be understood that when the remaining time domain resources of the m-th slot cannot carry the complete n-th uplink transmission channel and the remaining resources meet the first agreed condition, the uplink transmission channel is not transmitted in the remaining time domain resources, and the n-th uplink transmission channel is transmitted at the starting position of the m+1-th slot.

The first agreed condition includes: the quantity of time domain symbols of the remaining time domain resources is less than or equal to a preset threshold; or, the quantity of time domain symbols used for transmitting data in the remaining time domain resources is less than or equal to a preset threshold.

The quantity of time domain symbols of the remaining time domain resources refers to the quantity of all remaining time-domain symbols in the m-th slot after the n−1 uplink transmission channels are transmitted in the m-th slot. When the quantity of all remaining symbols is less than or equal to a preset threshold, it may be determined that the first agreed condition is met.

The quantity of time domain symbols used for transmitting data in the remaining time domain resources refers to the remaining quantity of time-domain symbols used for transmitting data after removing the resources for transmitting reference signals or padding symbols from the total quantity of time-domain symbols remaining in the m-th slot after n−1 uplink transmission channels have been transmitted in the m-th slot. For example, the quantity of all remaining time-domain symbols is 2. After removing one symbol for transmitting the padding symbols, the remaining one symbol is the quantity of time-domain symbols used for transmission. When the quantity is less than a preset threshold, it is determined that it meets the first agreed condition.

Taking the uplink transmission channel as a physical channel PUSCH as an example, which is also illustrated in FIG. 4. Currently, there are two slots, slot 1 and slot 2, target data is repeated K=8 times, one physical channel PUSCH occupies N=3 time domain symbols, and the slot contains the quantity of time domain symbols L=14. The terminal determines the time domain resources of various PUSCHs in time sequence from a start symbol. For the fifth PUSCH, since only 2 time domain symbols remain in the slot 1 and the threshold corresponding to the first agreed condition is 2, then the remaining 2 time domain symbols are less than or equal to the preset threshold, the first agreed condition is met, and the transmission of the fifth PUSCH is determined to start from a starting position of the slot 2.

Based on the first and second modes in the scenario 2, the method may further include the following processing: when the n-th uplink transmission channel starts to be transmitted at the starting position of the m+1-th slot, the method further includes: a reference signal or a padding signal is transmitted in the remaining time domain resources of the m-th slot; or, a first incomplete uplink channel is transmitted in the remaining time domain resources of the m-th slot, wherein the first incomplete uplink channel is used for transmitting the target data.

Figure 5:
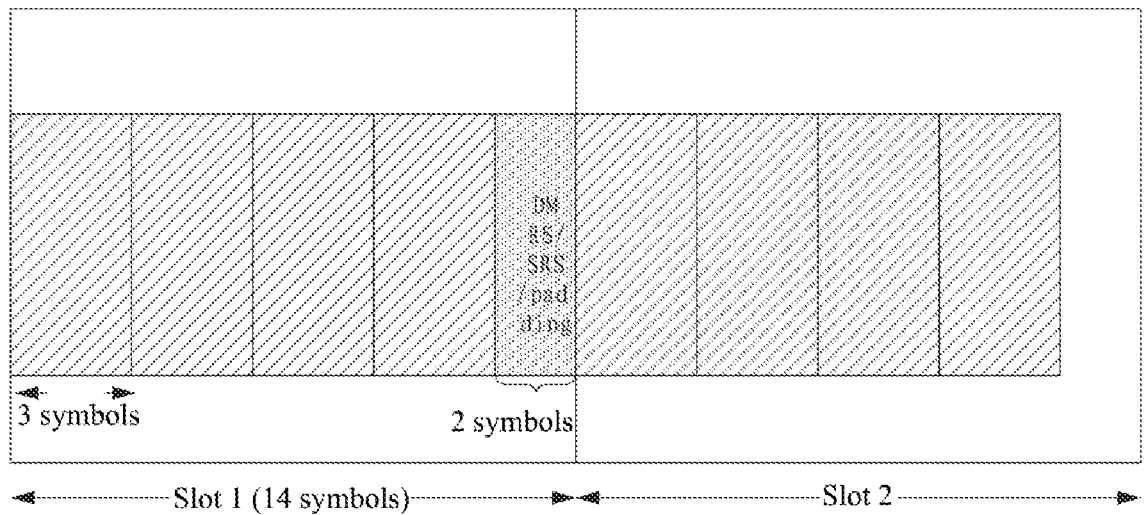
FIG. 5 is a third schematic diagram of a scenario in which information is repeatedly transmitted in a slot provided by an implementation of the present application.

That is, in order to avoid transmission interruption, an additional LBT may be introduced, for example, as shown in FIG. 5, the remaining 2 time domain symbols in the slot 1 are used for transmitting a Demodulation Reference Signal (DMRS) or a Sounding Reference Signal (SRS).

Figure 6:
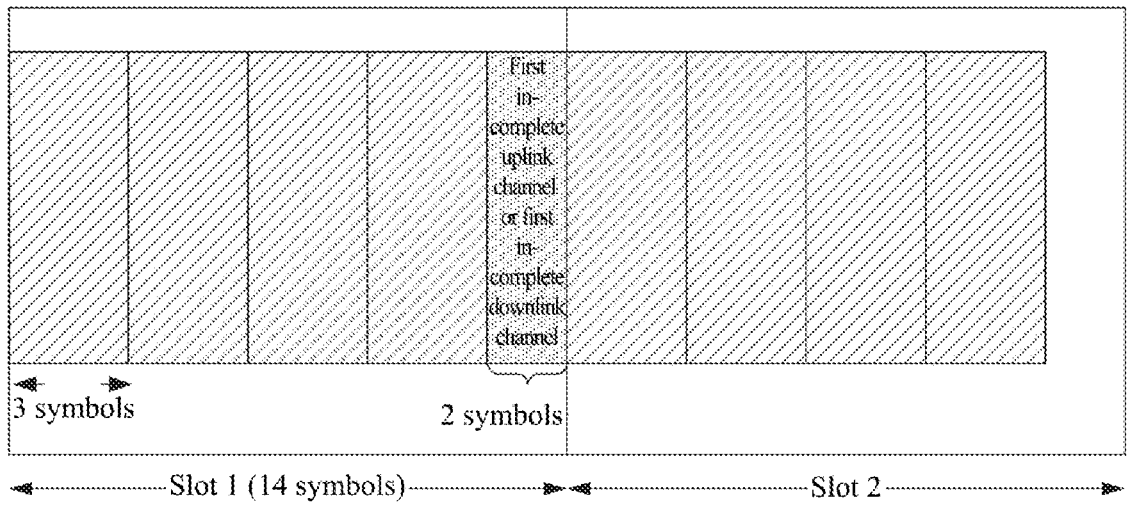
FIG. 6 is a fourth schematic diagram of a scenario in which information is repeatedly transmitted in a slot provided by an implementation of the present application.

Or, the first incomplete uplink channel may be transmitted in the remaining time domain resources of the m-th slot, as shown in FIG. 6, the remaining 2 time domain symbols in slot 1 are used for transmitting one incomplete uplink channel. It should be understood that the first incomplete uplink channel may be considered as the K+1-th uplink transmission channel, but the incomplete K+1-th uplink transmission channel is transmitted.

Scenario 3: when the remaining time domain resources of the slot are not sufficient to carry a complete uplink transmission channel, an incomplete n-th uplink transmission channel may be transmitted in the remaining time domain resources of the m-th slot. The following processing modes specifically exist:

Mode 1: when the remaining time domain resources of the m-th slot cannot carry the complete n-th uplink transmission channel, the incomplete n-th uplink transmission channel is directly transmitted in the remaining time domain resources of the m-th slot.

That is, regardless of the quantity of time domain symbols contained in the remaining time domain resources, the n-th uplink transmission channel is transmitted in the remaining time domain resources.

Figure 7:
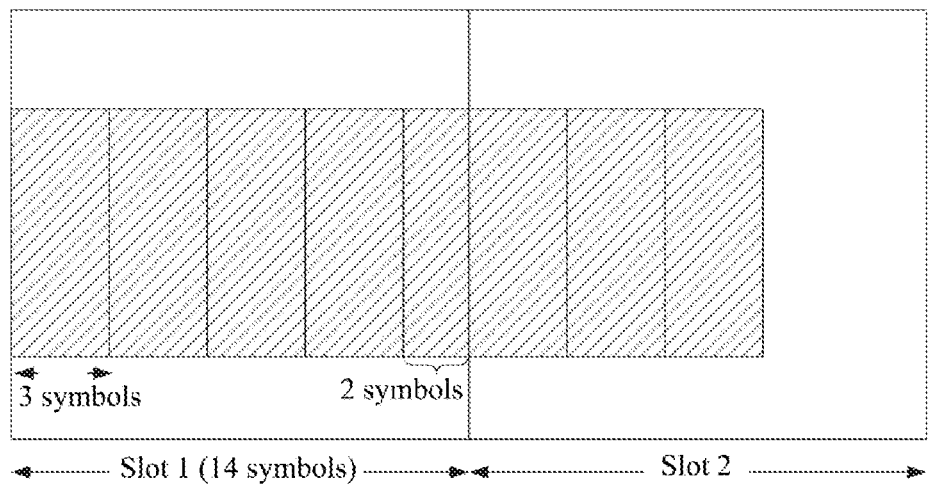
FIG. 7 is a fifth schematic diagram of a scenario in which information is repeatedly transmitted in a slot provided by an implementation of the present application.

At this time, the transmission times of the n-th uplink transmission channel may be counted into repeated times, for example, referring to FIG. 7, wherein, the incomplete n-th uplink transmission channel is transmitted once in the remaining 2 symbols of the slot 1 and counted into the repeated times, then the transmission is repeated 5 times in the slot 1 and 3 times in the slot 2.

Or, the transmission times of the n-th uplink transmission channel may be excluded from the repeated times, and at this time, the complete n-th uplink transmission channel will be transmitted again at the starting position of the m+1-th slot, and this transmission will be included in the repeated times.

Figures 8, 9, 10, 11:
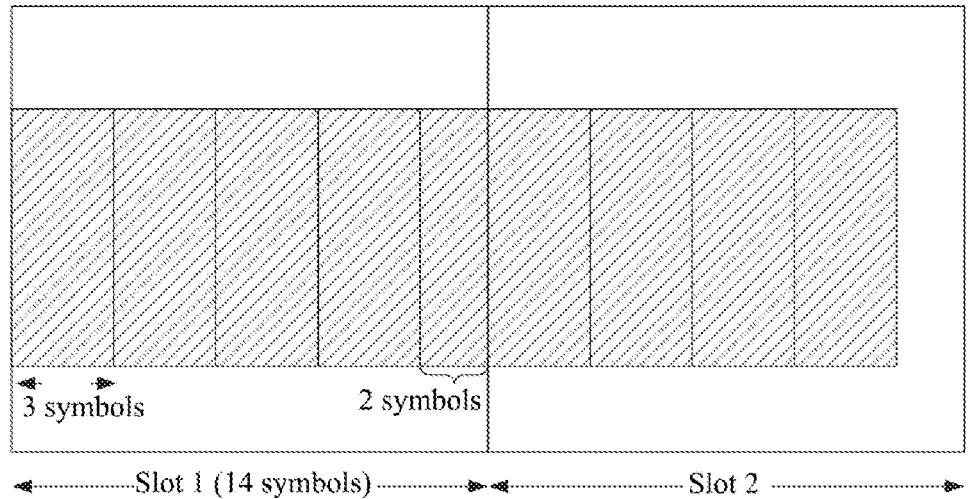
FIG. 8 is a sixth schematic diagram of a scenario in which information is repeatedly transmitted in a slot provided by an implementation of the present application.
FIG. 9 is a second schematic flow chart of a method for repeatedly transmitting information provided by an implementation of the present application.
FIG. 10 is a schematic structural diagram of a terminal device provided by an implementation of the present application.
FIG. 11 is a schematic structural diagram of a network device provided by an implementation of the present disclosure.

For example, referring to FIG. 8, if the incomplete n-th uplink transmission channel is transmitted on the remaining 2 symbols of the slot 1, and the repeated times are not counted, the transmission is repeated 4 times in the slot 1, and the last transmission of incomplete uplink channel is not counted in the repeated times, and the transmission is repeated 4 times in the slot 2, for a total of 8 repeated transmission times.

Or, if the remaining time domain resources of the m-th slot meet the following conditions, the incomplete uplink transmission channel transmitted in the remaining time domain resources is counted into the repeated transmission times, otherwise it is not counted into the repeated transmission times. The condition that the transmission is counted may include: the quantity of all time domain symbols in the remaining time domain resources is greater than or equal to a first preset threshold; or, the quantity of time domain symbols used for transmitting data in the remaining time domain resources is greater than or equal to a second preset threshold.

Mode 2, when the remaining time domain resources of the m-th slot cannot carry the complete n-th uplink transmission channel and the remaining resources meet the second agreed condition, the incomplete n-th uplink transmission channel is transmitted in the remaining time domain resources of the m-th slot.

In this mode, it may also include that the incomplete n-th uplink transmission channel is not transmitted in the remaining time domain resources of the m-th slot when the remaining time domain resources of the m-th slot cannot carry the complete n-th uplink transmission channel and the remaining resources do not meet the second agreed condition.

The second agreed condition is one of the following: the first agreed condition is not met; the quantity of time domain symbols of the remaining time domain resources is greater than or equal to a preset threshold; the quantity of time domain symbols used for transmitting data in the remaining time domain resources is greater than or equal to a preset threshold.

The first predetermined condition is that the quantity of time domain symbols of the remaining time domain resources is less than or equal to a preset threshold; or, the quantity of time domain symbols used for transmitting data in the remaining time domain resources is less than or equal to a preset threshold. Then, the second agreed condition is that the quantity of time domain symbols in the remaining time domain resources is greater than a preset threshold, or the quantity of time domain symbols used for transmission in the remaining time domain resources is greater than the preset threshold.

Further, the quantity of time domain symbols of the remaining time domain resources refers to the quantity of all remaining time domain symbols in the m-th slot after n−1 uplink transmission channels are transmitted in the m-th slot. When the quantity of all remaining symbols is greater than or equal to a preset threshold or greater than or equal to a preset threshold, it can be determined that it meets the second agreed condition.

The quantity of time-domain symbols used for transmitting data in the remaining time-domain resources refers to the quantity of remaining time-domain symbols used for transmitting data after removing the resources for transmitting reference signals or padding symbols from the total quantity of time domain symbols remaining in the m-th slot after n−1 uplink transmission channels are transmitted in the m-th slot. For example, the quantity of all remaining time-domain symbols is 2. After removing one symbol for transmitting the padding symbols, The remaining one symbol is the quantity of time domain symbols used for transmitting data, and when the quantity is greater than a preset threshold or when the quantity is greater than or equal to the preset threshold, it is determined that it meets the second agreed condition.

The preset threshold includes a first preset threshold and/or a second preset threshold. Specifically, the first preset threshold is a threshold determined based on the quantity of time domain symbols occupied by a complete uplink transmission channel; and/or the second preset threshold is a threshold determined based on the quantity of time domain symbols for transmitting data contained in a complete uplink transmission channel.

The first preset threshold may be calculated according to the following formula: $\lceil N/2 \rceil$ or $\lceil 2 \cdot N/3 \rceil$, wherein N is the quantity of time domain symbols occupied by a complete uplink transmission channel and is an integer greater than or equal to 1. The first preset threshold may adopt other calculation methods in addition to the above calculation methods, or may be set to other values, and it is not exhaustive in this implementation.

The second preset threshold may be calculated according to the following formula: $\lceil L/2 \rceil$ or $\lceil 2 \cdot L/3 \rceil$, wherein L is the quantity of time domain symbols for transmitting data contained in a complete uplink transmission channel, such as the quantity of remaining symbols for transmitting data in a complete uplink transmission channel except symbols occupied by DMRS. The calculation method of the second preset threshold may adopt the above calculation method, and may be set to other values, and it is not exhaustive in this implementation.

In actual processing, the several scenarios may be combined for processing. For example, the first agreed condition and the second agreed condition may be used in combination or separately.

Specifically, the judgment and subsequent processing may only be implemented by adopting the first agreed condition. When the remaining time domain resources of the m-th slot cannot carry the complete n-th uplink transmission channel and the remaining resources meet the first agreed condition, the n-th uplink transmission channel is started to be transmitted at a starting position of the m+1-th slot; or, when the remaining time domain resources of the m-th slot cannot carry the complete n-th uplink transmission channel and the remaining resources do not meet the first agreed condition, the incomplete n-th uplink transmission channel is transmitted in the remaining time domain resources of the m-th slot.

The judgment and subsequent processing may only be implemented by adopting the second agreed condition: when the remaining time domain resources of the m-th slot cannot carry the complete n-th uplink transmission channel and the remaining resources meet the second agreed condition, the incomplete n-th uplink transmission channel is transmitted in the remaining time domain resources of the m-th slot; or, when the remaining time domain resources of the m-th slot cannot carry the complete n-th uplink transmission channel and the remaining resources do not meet the second agreed condition, the n-th uplink transmission channel is not transmitted in the remaining time domain resources of the m-th slot, and the n-th uplink transmission channel is started to be transmitted at a starting position of the m+1-th slot.

It is also possible to adopt a comprehensive judgment and processing of the first agreed condition and the second agreed condition: when the remaining time domain resources of the m-th slot cannot carry the complete n-th uplink transmission channel and the remaining resources meet the first agreed condition, the n-th uplink transmission channel is started to be transmitted at the starting position of the m+1-th slot; at this time, the first incomplete uplink channel may be transmitted in the remaining resources of the m-th slot, or a reference signal or padding may be transmitted in the remaining resources of the m-th slot, or, when the remaining time domain resources of the m-th slot cannot carry the complete n-th uplink transmission channel and the remaining resources meet the second agreed condition, the incomplete n-th uplink transmission channel is transmitted in the remaining time domain resources of the m-th slot.

Finally, it should be pointed out that the processing of this implementation may be used in a grant free processing scenario.

It can be seen that by adopting the solution, it is determined how to repeatedly transmit target data through K transmission channels in continuous time domain resources of at least one continuous time sequence. By adopting the solution, the problem of increasing LBT opportunities caused by discontinuous transmission channels in time may be particularly avoided, thereby improving a success ratio of transmission.

Implementation Two

An implementation of the present disclosure provides a method for repeatedly transmitting information, which is applied to a network device. As shown in FIG. 9, the method includes act 901.

In act 901: K downlink transmission channels are transmitted on continuous time domain resources of at least one continuous slot; wherein the K downlink transmission channels are used for independently transmitting target data; K is an integer greater than or equal to 2; wherein, the K downlink transmission channels are transmitted on continuous time domain resources of at least one continuous slot, including: the n-th downlink transmission channel is transmitted in the m+1-th slot when the remaining time domain resources of the m-th slot cannot carry the complete n-th downlink transmission channel; or, the incomplete n-th downlink transmission channel is transmitted in the remaining time domain resources of the m-th slot when the remaining time domain resources of the m-th slot cannot carry the complete n-th downlink transmission channel, wherein n is an integer greater than or equal to 1 and less than or equal to K, and m is an integer greater than or equal to 1.

The continuous time domain resources may be continuous time domain symbols. The downlink transmission channel may be a Physical Downlink Shared Channel (PDSCH).

In the K downlink transmission channels, the time domain resources occupied by each downlink transmission channel are less than the quantity of time domain resources contained in one slot. For example, a slot may have 14 symbols, so the time domain resources occupied by a downlink transmission channel, i.e. the quantity of time domain symbols occupied is less than 14 symbols, may be 3 symbols.

In this implementation, the K downlink transmission channels repeatedly transmit identical content for K times; or, different transmission versions of same target data are carried in different downlink transmission channels in the K downlink transmission channels.

Specifically, the K downlink transmission channels are used for repeatedly transmitting the target data, which may be identical content, and the content may be the target data, or, may be target data of same transmission version; or, the K downlink transmission channels transmit the same target data but adopt different transmission versions.

Different transmission versions may be understood as same original information, that is, the same target data, but the encoded information is not identical. When the same content is transmitted, the same transmission block (TB) may be transmitted.

The following describes this implementation in various scenarios.

Scenario 1: K downlink transmission channels may be transmitted on continuous time domain resources of at least one continuous slot; that is, the K downlink transmission channels are continuously transmitted on continuous symbols of multiple continuous slots.

For example, referring to FIG. 3, assuming that the target data is repeated K=8 times, one physical channel PUSCH occupies N=3 time domain symbols, one slot contains the quantity of time domain symbols L=14, and at least one continuous slot is slot 1 and slot 2 respectively. Continuously transmitting K downlink transmission channels, i.e. the terminal device determines 8 PUSCHs according to a time sequence from a start symbol of the slot 1 until a transmission of the K downlink transmission channels is completed.

Scenario 2: when the remaining time domain resources of the slot are not sufficient to carry a complete downlink transmission channel, the downlink transmission channel may not be transmitted in the part of remaining time domain resources. The following processing modes specifically exist:

Mode 1: when the remaining time domain resources of the m-th slot cannot carry the complete n-th downlink transmission channel, the n-th downlink transmission channel is transmitted in the m+1-th slot, including: when the remaining time domain resources of the m-th slot cannot carry the complete n-th downlink transmission channel, starting to transmit the n-th downlink transmission channel at a starting position of the m+1-th slot. At this time, the n-th downlink transmission channel may not be transmitted in the remaining time domain resources.

Taking the downlink transmission channel as a physical channel PUSCH as an example, as shown in FIG. 4, currently there are two slots, slot 1 and slot 2. The target data is repeated K=8 times, one physical channel PUSCH occupies N=3 time domain symbols, and the slot contains the quantity of time domain symbols L=14. The terminal determines the time domain resources of each PUSCH according to a time sequence from a start symbol. For the fifth PUSCH, since only 2 time domain symbols remain in the slot 1, which is not sufficient to carry a complete PUSCH once, the fifth PUSCH is transmitted from a starting position of the slot 2.

Mode 2: when the remaining time domain resources of the m-th slot cannot carry the complete n-th downlink transmission channel, the n-th downlink transmission channel is transmitted in the m+1-th slot, including: when the remaining time domain resources of the m-th slot cannot carry the complete n-th downlink transmission channel and the remaining resources meet a first agreed condition, the n-th downlink transmission channel is transmitted at a starting position of the m+1-th slot.

At this time, it can also be understood that when the remaining time domain resources of the m-th slot cannot carry the complete n-th downlink transmission channel and the remaining resources meet the first agreed condition, the downlink transmission channel is not transmitted in the remaining time domain resources, and the n-th downlink transmission channel is transmitted at the starting position of the m+1-th slot.

The first agreed condition includes: the quantity of time domain symbols of the remaining time domain resources is less than or equal to a preset threshold; or, the quantity of time domain symbols used for transmitting data in the remaining time domain resources is less than or equal to a preset threshold.

The quantity of time domain symbols of the remaining time domain resources refers to the quantity of all remaining time-domain symbols in the m-th slot after the n−1 downlink transmission channels are transmitted in the m-th slot. When the quantity of all remaining symbols is less than or equal to a preset threshold, it may be determined that the first agreed condition is met.

The quantity of time domain symbols used for transmitting data in the remaining time domain resources refers to the remaining quantity of time-domain symbols used for transmitting data after removing the resources for transmitting reference signals or padding symbols from the total quantity of time-domain symbols remaining in the m-th slot after n−1 downlink transmission channels have been transmitted on the m-th slot. For example, the quantity of all remaining time-domain symbols is 2. After removing one symbol for transmitting the padding symbols, the remaining one symbol is the quantity of time-domain symbols used for transmitting data. When the quantity is less than a preset threshold, it is determined that it meets the first agreed condition.

Taking the downlink transmission channel as a physical channel PUSCH as an example, which is also illustrated in FIG. 4. Currently, there are two slots, slot 1 and slot 2, target data is repeated K=8 times, one physical channel PUSCH occupies N=3 time domain symbols, and the slot contains the quantity of time domain symbols L=14. The terminal determines the time domain resources of each PUSCH in time sequence from a start symbol. For the fifth PUSCH, since only 2 time domain symbols remain in the slot 1 and the threshold corresponding to the first agreed condition is 2, then the remaining 2 time domain symbols are less than or equal to the preset threshold, the first agreed condition is satisfied, and the transmission of the fifth PUSCH is determined to start from a starting position of the slot 2.

Based on the first and second modes in the scenario 2, the method may further include the following processing: when the n-th downlink transmission channel starts to be transmitted at the starting position of the m+1-th slot, the method further includes: a reference signal or a padding signal is transmitted in the remaining time domain resources of the m-th slot; or, a first incomplete downlink channel is transmitted in the remaining time domain resources of the m-th slot, wherein the first incomplete downlink channel is used for transmitting the target data.

That is, in order to avoid transmission interruption, an additional LBT may be introduced, for example, as shown in FIG. 5, the remaining 2 time domain symbols in the slot 1 are used for transmitting a Demodulation Reference Signal (DMRS) or a Sounding Reference Signal (SRS).

Or, the first incomplete downlink channel may be transmitted on the remaining time domain resources of the m-th slot, as shown in FIG. 6, the remaining 2 time domain symbols in slot 1 are used for transmitting one incomplete downlink channel. It should be understood that the first incomplete downlink channel may be considered as the K+1-th downlink transmission channel, but the incomplete K+1-th downlink transmission channel is transmitted.

Scenario 3: when the remaining time domain resources of the slot are not sufficient to carry a complete downlink transmission channel, an incomplete n-th downlink transmission channel may be transmitted on the remaining time domain resources of the m-th slot. The following processing modes specifically exist:

Mode 1: when the remaining time domain resources of the m-th slot cannot carry the complete n-th downlink transmission channel, the incomplete n-th downlink transmission channel is directly transmitted in the remaining time domain resources of the m-th slot.

That is, regardless of the quantity of time domain symbols contained in the remaining time domain resources, the n-th downlink transmission channel is transmitted on the remaining time domain resources.

At this time, the transmission times of the n-th downlink transmission channel may be counted into repeated times, for example, referring to FIG. 7, wherein, the incomplete n-th downlink transmission channel is transmitted once in the remaining 2 symbols of the slot 1 and counted into the repeated times, then the transmission is repeated 5 times in the slot 1 and 3 times in the slot 2.

Or, the transmission times of the n-th downlink transmission channel may be excluded from the repeated times, and at this time, the complete n-th downlink transmission channel will be transmitted again at the starting position of the m+1-th slot, and this transmission will be included in the repeated times. For example, referring to FIG. 8, if the incomplete n-th downlink transmission channel is transmitted in the remaining 2 symbols of the slot 1, and the repeated times are not counted, the transmission is repeated 4 times in the slot 1, and the last transmission of incomplete downlink channel is not counted in the repeated times, and the transmission is repeated 4 times in the slot 2, for a total of 8 repeated transmission times.

Or, if the remaining time domain resources of the m-th slot meet the following conditions, the incomplete downlink transmission channel transmitted on the remaining time domain resources is counted into the repeated transmission times, otherwise it is not counted into the repeated transmission times. The condition that the transmission is counted may include: the quantity of all time domain symbols in the remaining time domain resources is greater than or equal to a first preset threshold; or, the quantity of time domain symbols used for transmitting data in the remaining time domain resources is greater than or equal to a second preset threshold.

Mode 2, when the remaining time domain resources of the m-th slot cannot carry the complete n-th downlink transmission channel and the remaining resources meet the second agreed condition, the incomplete n-th downlink transmission channel is transmitted in the remaining time domain resources of the m-th slot.

In this mode, it may also include that the incomplete n-th downlink transmission channel is not transmitted in the remaining time domain resources of the m-th slot when the remaining time domain resources of the m-th slot cannot carry the complete n-th downlink transmission channel and the remaining resources do not meet the second agreed condition.

The second agreed condition is one of the following: the first agreed condition is not met; the quantity of time domain symbols of the remaining time domain resources is greater than or equal to a preset threshold; the quantity of time domain symbols used for transmitting data in the remaining time domain resources is greater than or equal to a preset threshold.

The first predetermined condition is that the quantity of time domain symbols of the remaining time domain resources is less than or equal to a preset threshold; or, the quantity of time domain symbols used for transmitting data in the remaining time domain resources is less than or equal to a preset threshold. Then, the second agreed condition is that the quantity of time domain symbols in the remaining time domain resources is greater than a preset threshold, or the quantity of time domain symbols used for transmission in the remaining time domain resources is greater than the preset threshold.

Further, the quantity of time domain symbols of the remaining time domain resources refers to the quantity of all time domain symbols remaining in the m-th slot after n−1 downlink transmission channels are transmitted in the m-th slot. When the quantity of all remaining symbols is greater than or equal to a preset threshold or greater than or equal to a preset threshold, it can be determined that it meets the second agreed condition.

The quantity of time-domain symbols used for transmitting data in the remaining time-domain resources refers to the quantity of remaining time-domain symbols used for transmitting data after removing the resources for transmitting reference signals or padding symbols from the total quantity of time domain symbols remaining in the m-th slot after n−1 downlink transmission channels are transmitted in the m-th slot. For example, the quantity of all remaining time-domain symbols is 2. After removing one symbol for transmitting the padding symbols, the remaining one symbol is the quantity of time domain symbols to which the transmission belongs, and when the quantity is greater than a preset threshold or when the quantity is greater than or equal to the preset threshold, it is determined that it meets the second agreed condition.

The preset threshold includes a first preset threshold and/or a second preset threshold. Specifically, the first preset threshold is a threshold determined based on the quantity of time domain symbols occupied by a complete downlink transmission channel; and/or the second preset threshold is a threshold determined based on the quantity of time domain symbols of transmission data contained in a complete downlink transmission channel.

The first preset threshold may be calculated according to the following formula: $\lceil N/2 \rceil$ or $\lceil 2 \cdot N/3 \rceil$, wherein N is the quantity of time domain symbols occupied by a complete downlink transmission channel and is an integer greater than or equal to 1. The first preset threshold may adopt other calculation methods in addition to the above calculation methods, or may be set to other values, and it is not exhaustive in this implementation.

The second preset threshold may be calculated according to the following formula: $\lceil L/2 \rceil$ or $\lceil 2 \cdot L/3 \rceil$, wherein L is the quantity of time domain symbols for transmitting data contained in a complete downlink transmission channel, such as the quantity of symbols remaining for transmitting data in a complete downlink transmission channel except symbols occupied by DMRS. The calculation method of the second preset threshold may adopt the above calculation method, and may be set to other values, and it is not exhaustive in this implementation.

In actual processing, the several scenarios may be combined for processing. For example, the first agreed condition and the second agreed condition may be used in combination or separately.

Specifically, the judgment and subsequent processing may only be implemented by adopting the first agreed condition. When the remaining time domain resources of the m-th slot cannot carry the complete n-th downlink transmission channel and the remaining resources meet the first agreed condition, the n-th downlink transmission channel is started to be transmitted at a starting position of the m+1-th slot; or, when the remaining time domain resources of the m-th slot cannot carry the complete n-th downlink transmission channel and the remaining resources do not meet the first agreed condition, the incomplete n-th downlink transmission channel is transmitted in the remaining time domain resources of the m-th slot.

The judgment and subsequent processing may only be implemented by adopting the second agreed condition: when the remaining time domain resources of the m-th slot cannot carry the complete n-th downlink transmission channel and the remaining resources meet the second agreed condition, the incomplete n-th downlink transmission channel is transmitted in the remaining time domain resources of the m-th slot; or, when the remaining time domain resources of the m-th slot cannot carry the complete n-th downlink transmission channel and the remaining resources do not meet the second agreed condition, the n-th downlink transmission channel is not transmitted in the remaining time domain resources of the m-th slot, and the n-th downlink transmission channel is started to be transmitted at a starting position of the m+1-th slot.

It is also possible to adopt a comprehensive judgment and processing of the first agreed condition and the second agreed condition: when the remaining time domain resources of the m-th slot cannot carry the complete n-th downlink transmission channel and the remaining resources meet the first agreed condition, the n-th downlink transmission channel is started to be transmitted at the starting position of the m+1-th slot; at this time, the first incomplete downlink channel may be transmitted in the remaining resources of the m-th slot, or a reference signal or padding may be transmitted in the remaining resources of the m-th slot, or, when the remaining time domain resources of the m-th slot cannot carry the complete n-th downlink transmission channel and the remaining resources meet the second agreed condition, the incomplete n-th downlink transmission channel is transmitted in the remaining time domain resources of the m-th slot.

Finally, it should be pointed out that the processing of this implementation may be used in a grant free processing scenario.

It can be seen that by adopting the solution, it is determined how to repeatedly transmit target data through K transmission channels in continuous time domain resources of at least one continuous time sequence. By adopting the solution, the problem of increasing LBT opportunities caused by discontinuous transmission channels in time may be particularly avoided, thereby improving a success ratio of transmission.

Implementation Three

An implementation of the present disclosure provides a terminal device, as shown in FIG. 10. The terminal device includes a first communication unit 1001.

The first communication unit 1001 is configured to transmit K uplink transmission channels on continuous time domain resources of at least one continuous slot; wherein the K downlink transmission channels are used for independently transmitting target data; K is an integer greater than or equal to 2; wherein, the transmission of K downlink transmission channels on continuous time domain resources of at least one continuous slot includes: the n-th uplink transmission channel is transmitted in the m+1-th slot when remaining time domain resources of the m-th slot cannot carry a complete n-th uplink transmission channel; or, the incomplete n-th uplink transmission channel is transmitted in the remaining time domain resources of the m-th slot when the remaining time domain resources of the m-th slot cannot carry the complete n-th uplink transmission channel; wherein n is an integer greater than or equal to 1 and less than or equal to K, and m is an integer greater than or equal to 1.

The continuous time domain resources can be continuous time domain symbols; the uplink transmission channel may be a Physical Uplink Shared Channel.

In the K uplink transmission channels, the time domain resources occupied by each uplink transmission channel are smaller than the quantity of time domain resources contained in one slot. For example, a slot may have 14 symbols, so the time domain resources occupied by an uplink transmission channel, i.e. the quantity of time domain symbols occupied is less than 14 symbols, may be 3 symbols.

In this implementation, the K uplink transmission channels repeatedly transmit identical content K times; or, different transmission versions of same target data are carried on different uplink transmission channels in the K uplink transmission channels.

Specifically, the K uplink transmission channels are used for repeatedly transmitting the target data, which may be identical content, and the content may be the target data, or, may be target data of same transmission version; or, the K uplink transmission channels transmit the same target data but adopt different transmission versions.

Different transmission versions may be understood as same original information, that is, the same target data, but the encoded information is not identical. When the same content is transmitted, the same transmission block (TB) may be transmitted.

The following describes this implementation in various scenarios.

Scenario 1: K uplink transmission channels may be transmitted in continuous time domain resources of at least one continuous slot; that is, the K uplink transmission channels are continuously transmitted on continuous symbols of multiple continuous slots.

For example, referring to FIG. 3, assuming that the target data is repeated K=8 times, one physical channel PUSCH occupies N=3 time domain symbols, one slot contains the quantity of time domain symbols L=14, and at least one continuous slot is slot 1 and slot 2 respectively. Continuously transmitting K uplink transmission channels, i.e. the terminal device determines 8 PUSCHs according to a time sequence from a start symbol of the slot 1 until a transmission of the K uplink transmission channels is completed.

Scenario 2: when the remaining time domain resources of the slot are not sufficient to carry a complete uplink transmission channel, the uplink transmission channel may not be transmitted in the part of remaining time domain resources. The following processing modes specifically exist:

Mode 1: the first communication unit 1001 is configured to start to transmit the n-th uplink transmission channel at a starting position of the m+1-th slot when the remaining time domain resources of the m-th slot cannot carry the complete n-th uplink transmission channel. At this time, the n-th uplink transmission channel may not be transmitted in the remaining time domain resources.

Taking the uplink transmission channel as a physical channel PUSCH as an example, as shown in FIG. 4, currently there are two slots, slot 1 and slot 2. The target data is repeated K=8 times, one physical channel PUSCH occupies N=3 time domain symbols, and the slot contains the quantity of time domain symbols L=14. The terminal determines the time domain resources of each PUSCH according to a time sequence from a start symbol. For the fifth PUSCH, since only 2 time domain symbols remain in the slot 1, which is not sufficient to carry a complete PUSCH once, the fifth PUSCH is transmitted from a starting position of the slot 2.

Mode 2: the first communication unit 1001 is configured to transmit the n-th uplink transmission channel at a starting position of the m+1-th slot when the remaining time domain resources of the m-th slot cannot carry the complete n-th uplink transmission channel and the remaining resources meet a first agreed condition.

At this time, it can also be understood that when the remaining time domain resources of the m-th slot cannot carry the complete n-th uplink transmission channel and the remaining resources meet the first agreed condition, the uplink transmission channel is not transmitted in the remaining time domain resources, and the n-th uplink transmission channel is transmitted at the starting position of the m+1-th slot.

The first agreed condition includes: the quantity of time domain symbols of the remaining time domain resources is less than or equal to a preset threshold; or, the quantity of time domain symbols used for transmitting data in the remaining time domain resources is less than or equal to a preset threshold.

The quantity of time domain symbols of the remaining time domain resources refers to the quantity of all time-domain symbols remaining in the m-th slot after the n−1 uplink transmission channels are transmitted on the m-th slot. When the quantity of all remaining symbols is less than or equal to a preset threshold, it may be determined that the first agreed condition is met.

The quantity of time domain symbols used for transmitting data in the remaining time domain resources refers to the remaining quantity of time-domain symbols used for transmitting data after removing the resources for transmitting reference signals or padding symbols from the total quantity of time-domain symbols remaining in the m-th slot after n−1 uplink transmission channels have been transmitted in the m-th slot. For example, the quantity of all remaining time-domain symbols is 2. After removing one symbol for transmitting the padding symbols, the remaining one symbol is the quantity of time-domain symbols used for transmission. When the quantity is less than a preset threshold, it is determined that it meets the first agreed condition.

Taking the uplink transmission channel as a physical channel PUSCH as an example, which is also illustrated in FIG. 4. Currently, there are two slots, slot 1 and slot 2, target data is repeated K=8 times, one physical channel PUSCH occupies N=3 time domain symbols, and the slot contains the quantity of time domain symbols L=14. The terminal determines the time domain resources of various PUSCHs in time sequence from a start symbol. For the fifth PUSCH, since only 2 time domain symbols remain in the slot 1 and the threshold corresponding to the first agreed condition is 2, then the remaining 2 time domain symbols are less than or equal to the preset threshold, the first agreed condition is satisfied, and the transmission of the fifth PUSCH is determined to start from a starting position of the slot 2.

Based on the first and second modes in the scenario 2, the method may further include the following processing: when the n-th uplink transmission channel starts to be transmitted at the starting position of the m+1st slot, the method further includes: a reference signal or a padding signal is transmitted in the remaining time domain resources of the m-th slot; or, a first incomplete uplink channel is transmitted in the remaining time domain resources of the m-th slot, wherein the first incomplete uplink channel is used for transmitting the target data.

That is, in order to avoid transmission interruption, an additional LBT may be introduced, for example, as shown in FIG. 5, the remaining 2 time domain symbols in the slot 1 are used for transmitting a Demodulation Reference Signal (DMRS) or a Sounding Reference Signal (SRS).

Or, the first incomplete uplink channel may be transmitted on the remaining time domain resources of the m-th slot, as shown in FIG. 6, the remaining 2 time domain symbols in slot 1 are used for transmitting one incomplete uplink channel. It should be understood that the first incomplete uplink channel may be considered as the K+1-th uplink transmission channel, but the incomplete K+1-th uplink transmission channel is transmitted.

Scenario 3: when the remaining time domain resources of the slot are not sufficient to carry a complete uplink transmission channel, an incomplete n-th uplink transmission channel may be transmitted in the remaining time domain resources of the m-th slot. The following processing modes specifically exist:

Mode 1: the first communication unit 1001 is configured to directly transmit the incomplete n-th uplink transmission channel in the remaining time domain resources of the m-th slot when the remaining time domain resources of the m-th slot cannot carry the complete n-th uplink transmission channel.

That is, regardless of the quantity of time domain symbols contained in the remaining time domain resources, the n-th uplink transmission channel is transmitted in the remaining time domain resources.

At this time, the transmission times of the n-th uplink transmission channel may be counted into repeated times, for example, referring to FIG. 7, wherein, the incomplete n-th uplink transmission channel is transmitted once in the remaining 2 symbols of the slot 1 and counted into the repeated times, then the transmission is repeated 5 times in the slot 1 and 3 times in the slot 2.

Or, the transmission times of the n-th uplink transmission channel may be excluded from the repeated times, and at this time, the complete n-th uplink transmission channel will be transmitted again at the starting position of the m+1-th slot, and this transmission will be included in the repeated times. For example, referring to FIG. 8, if the incomplete n-th uplink transmission channel is transmitted in the remaining 2 symbols of the slot 1, and the repeated times are not counted, the transmission is repeated 4 times in the slot 1, and the last transmission of incomplete uplink channel is not counted in the repeated times, and the transmission is repeated 4 times in the slot 2, for a total of 8 repeated transmission times.

Or, if the remaining time domain resources of the m-th slot meet the following conditions, the incomplete uplink transmission channel transmitted on the remaining time domain resources is counted into the repeated transmission times, otherwise it is not counted into the repeated transmission times. The condition that the transmission is counted may include: the quantity of all time domain symbols in the remaining time domain resources is greater than or equal to a first preset threshold; or, the quantity of time domain symbols used for transmitting data in the remaining time domain resources is greater than or equal to a second preset threshold.

Mode 2, the first communication unit 1001 is configured to transmit the incomplete n-th uplink transmission channel in the remaining time domain resources of the m-th slot when the remaining time domain resources of the m-th slot cannot carry the complete n-th uplink transmission channel and the remaining resources meet the second agreed condition.

In this mode, it may also include that the incomplete n-th uplink transmission channel is not transmitted in the remaining time domain resources of the m-th slot when the remaining time domain resources of the m-th slot cannot carry the complete n-th uplink transmission channel and the remaining resources do not meet the second agreed condition.

The second agreed condition is one of the following: the first agreed condition is not met; the quantity of time domain symbols of the remaining time domain resources is greater than or equal to a preset threshold; the quantity of time domain symbols used for transmitting data on the remaining time domain resources is greater than or equal to a preset threshold.

The first predetermined condition is that the quantity of time domain symbols of the remaining time domain resources is less than or equal to a preset threshold; or, the quantity of time domain symbols used for transmitting data in the remaining time domain resources is less than or equal to a preset threshold. Then, the second agreed condition is that the quantity of time domain symbols in the remaining time domain resources is greater than a preset threshold, or the quantity of time domain symbols used for transmission in the remaining time domain resources is greater than the preset threshold.

Further, the quantity of time domain symbols of the remaining time domain resources refers to the quantity of all time domain symbols remaining on the m-th slot after n−1 uplink transmission channels are transmitted in the m-th slot. When the quantity of all remaining symbols is greater than or equal to a preset threshold or greater than or equal to a preset threshold, it can be determined that it meets the second agreed condition.

The quantity of time-domain symbols used for transmitting data in the remaining time-domain resources refers to the quantity of remaining time-domain symbols used for transmitting data after removing the resources for transmitting reference signals or padding symbols from the total quantity of time domain symbols remaining in the m-th slot after n−1 uplink transmission channels are transmitted on the m-th slot. For example, the quantity of all remaining time-domain symbols is 2. After removing one symbol for transmitting the padding symbols, The remaining one symbol is the quantity of time domain symbols used for transmitting data, and when the quantity is greater than a preset threshold or when the quantity is greater than or equal to the preset threshold, it is determined that it meets the second agreed condition.

The preset threshold includes a first preset threshold and/or a second preset threshold. Specifically, the first preset threshold is a threshold determined based on the quantity of time domain symbols occupied by a complete uplink transmission channel; and/or the second preset threshold is a threshold determined based on the quantity of time domain symbols of transmission data contained in a complete uplink transmission channel.

The first preset threshold may be calculated according to the following formula: $\lceil N/2 \rceil$ or $\lceil 2 \cdot N/3 \rceil$, wherein N is the quantity of time domain symbols occupied by a complete uplink transmission channel and is an integer greater than or equal to 1. The first preset threshold may adopt other calculation methods in addition to the above calculation methods, or may be set to other values, and it is not exhaustive in this implementation.

The second preset threshold may be calculated according to the following formula: ⌊L/2⌋ or ⌈2·L/3⌉, wherein L is the quantity of time domain symbols for transmitting data contained in a complete uplink transmission channel, such as the quantity of symbols remaining for transmitting data in a complete uplink transmission channel except symbols occupied by DMRS. The calculation method of the second preset threshold may adopt the above calculation method, and may be set to other values, and it is not exhaustive in this implementation.

In actual processing, the several scenarios may be combined for processing. For example, the first agreed condition and the second agreed condition may be used in combination or separately.

Specifically, the judgment and subsequent processing may only be implemented by adopting the first agreed condition. When the remaining time domain resources of the m-th slot cannot carry the complete n-th uplink transmission channel and the remaining resources meet the first agreed condition, the n-th uplink transmission channel is started to be transmitted at a starting position of the m+1-th slot; or, when the remaining time domain resources of the m-th slot cannot carry the complete n-th uplink transmission channel and the remaining resources do not meet the first agreed condition, the incomplete n-th uplink transmission channel is transmitted in the remaining time domain resources of the m-th slot.

The judgment and subsequent processing may only be implemented by adopting the second agreed condition: when the remaining time domain resources of the m-th slot cannot carry the complete n-th uplink transmission channel and the remaining resources meet the second agreed condition, the incomplete n-th uplink transmission channel is transmitted in the remaining time domain resources of the m-th slot; or, when the remaining time domain resources of the m-th slot cannot carry the complete n-th uplink transmission channel and the remaining resources do not meet the second agreed condition, the n-th uplink transmission channel is not transmitted in the remaining time domain resources of the m-th slot, and the n-th uplink transmission channel is started to be transmitted at a starting position of the m+1-th slot.

It is also possible to adopt a comprehensive judgment and processing of the first agreed condition and the second agreed condition: when the remaining time domain resources of the m-th slot cannot carry the complete n-th uplink transmission channel and the remaining resources meet the first agreed condition, the n-th uplink transmission channel is started to be transmitted at the starting position of the m+1-th slot; at this time, the first incomplete uplink channel may be transmitted in the remaining resources of the m-th slot, or a reference signal or padding may be transmitted in the remaining resources of the m-th slot, or, when the remaining time domain resources of the m-th slot cannot carry the complete n-th uplink transmission channel and the remaining resources meet the second agreed condition, the incomplete n-th uplink transmission channel is transmitted in the remaining time domain resources of the m-th slot.

Finally, it should be pointed out that the processing of this implementation may be used in a grant free processing scenario.

It can be seen that by adopting the solution, it is determined how to repeatedly transmit target data through K transmission channels in continuous time domain resources of at least one continuous time sequence. By adopting the solution, the problem of increasing LBT opportunities caused by discontinuous transmission channels in time may be particularly avoided, thereby improving a success ratio of transmission.

Implementation Four

An implementation of the present disclosure provides a network device. As shown in FIG. 11, the network device includes a second communication unit 1101.

The second communication unit 1101 is configured to transmit K downlink transmission channels in continuous time domain resources of at least one continuous slot; wherein the K downlink transmission channels are used for independently transmitting target data; K is an integer greater than or equal to 2; wherein, the K downlink transmission channels are transmitted in continuous time domain resources of at least one continuous slot, including: the n-th downlink transmission channel is transmitted in the m+1-th slot when the remaining time domain resources of the m-th slot cannot carry the complete n-th downlink transmission channel; or, the incomplete n-th downlink transmission channel is transmitted in the remaining time domain resources of the m-th slot when the remaining time domain resources of the m-th slot cannot carry the complete n-th downlink transmission channel, wherein n is an integer greater than or equal to 1 and less than or equal to K, and m is an integer greater than or equal to 1.

The continuous time domain resources may be continuous time domain symbols. The downlink transmission channel may be a Physical Downlink Shared Channel (PDSCH).

In the K downlink transmission channels, the time domain resources occupied by each downlink transmission channel are smaller than the quantity of time domain resources contained in one slot. For example, a slot may have 14 symbols, so the time domain resources occupied by a downlink transmission channel, i.e. the quantity of time domain symbols occupied is less than 14 symbols, may be 3 symbols.

In this implementation, the K downlink transmission channels repeatedly transmit identical content for K times; or, different transmission versions of same target data are carried in different downlink transmission channels in the K downlink transmission channels.

Specifically, the K downlink transmission channels are used for repeatedly transmitting the target data, which may be identical content, and the content may be the target data, or, may be target data of same transmission version; or, the K downlink transmission channels transmit the same target data but adopt different transmission versions.

Different transmission versions may be understood as same original information, that is, the same target data, but the encoded information is not identical. When the same content is transmitted, the same transmission block (TB) may be transmitted.

The following describes this implementation in various scenarios.

Scenario 1: K downlink transmission channels may be transmitted in continuous time domain resources of at least one continuous slot; that is, the K downlink transmission channels are continuously transmitted on continuous symbols of multiple continuous slots.

For example, referring to FIG. 3, assuming that the target data is repeated K=8 times, one physical channel PUSCH occupies N=3 time domain symbols, one slot contains the quantity of time domain symbols L=14, and at least one continuous slot is slot 1 and slot 2 respectively. Continuously transmitting K downlink transmission channels, i.e. the terminal device determines 8 PUSCHs according to a time sequence from a start symbol of the slot 1 until a transmission of the K downlink transmission channels is completed.

Scenario 2: when the remaining time domain resources of the slot are not sufficient to carry a complete downlink transmission channel, the downlink transmission channel may not be transmitted in the part of remaining time domain resources. The following processing modes specifically exist:

Mode 1: the second communication unit 1101 is configured to start to transmit the n-th downlink transmission channel at a starting position of the m+1-th slot when the remaining time domain resources of the m-th slot cannot carry the complete n-th downlink transmission channel. At this time, the n-th downlink transmission channel may not be transmitted in the remaining time domain resources.

Taking the downlink transmission channel as a physical channel PUSCH as an example, as shown in FIG. 4, currently there are two slots, slot 1 and slot 2. The target data is repeated K=8 times, one physical channel PUSCH occupies N=3 time domain symbols, and the slot contains the quantity of time domain symbols L=14. The terminal determines the time domain resources of each PUSCH according to a time sequence from a start symbol. For the fifth PUSCH, since only 2 time domain symbols remain in the slot 1, which is not sufficient to carry a complete PUSCH once, the fifth PUSCH is transmitted from a starting position of the slot 2.

Mode 2: the second communication unit 1101 is configured to transmit the n-th downlink transmission channel at a starting position of the m+1-th slot when the remaining time domain resources of the m-th slot cannot carry the complete n-th downlink transmission channel and the remaining resources meet a first agreed condition.

At this time, it can also be understood that when the remaining time domain resources of the m-th slot cannot carry the complete n-th downlink transmission channel and the remaining resources meet the first agreed condition, the downlink transmission channel is not transmitted in the remaining time domain resources, and the n-th downlink transmission channel is transmitted at the starting position of the m+1-th slot.

The first agreed condition includes: the quantity of time domain symbols of the remaining time domain resources is less than or equal to a preset threshold; or, the quantity of time domain symbols used for transmitting data in the remaining time domain resources is less than or equal to a preset threshold.

The quantity of time domain symbols of the remaining time domain resources refers to the quantity of all remaining time-domain symbols in the m-th slot after the n−1 downlink transmission channels are transmitted in the m-th slot. When the quantity of all remaining symbols is less than or equal to a preset threshold, it may be determined that the first agreed condition is met.

The quantity of time domain symbols used for transmitting data in the remaining time domain resources refers to the remaining quantity of time-domain symbols used for transmitting data after removing the resources for transmitting reference signals or padding symbols from the total quantity of time-domain symbols remaining in the m-th slot after n−1 downlink transmission channels have been transmitted on the m-th slot. For example, the quantity of all remaining time-domain symbols is 2. After removing one symbol for transmitting the padding symbols, the remaining one symbol is the quantity of time-domain symbols used for transmission. When the quantity is less than a preset threshold, it is determined that it meets the first agreed condition.

Taking the downlink transmission channel as a physical channel PUSCH as an example, it is also illustrated in FIG. 4. Currently, there are two slots, slot 1 and slot 2, target data is repeated K=8 times, one physical channel PUSCH occupies N=3 time domain symbols, and the slot contains the quantity of time domain symbols L=14. The terminal determines the time domain resources of each PUSCH in time sequence from a start symbol. For the fifth PUSCH, since only 2 time domain symbols remain in the slot 1 and the threshold corresponding to the first agreed condition is 2, then the remaining 2 time domain symbols are less than or equal to the preset threshold, the first agreed condition is satisfied, and the transmission of the fifth PUSCH is determined to start from a starting position of the slot 2.

Based on the first and second modes in the scenario 2, the method may further include the following processing: when the n-th downlink transmission channel starts to be transmitted at the starting position of the m+1 st slot, the method further includes: a reference signal or a padding signal is transmitted in the remaining time domain resources of the m-th slot; or, a first incomplete downlink channel is transmitted in the remaining time domain resources of the m-th slot, wherein the first incomplete downlink channel is used for transmitting the target data. That is, in order to avoid transmission interruption, an additional LBT may be introduced, for example, as shown in FIG. 5, the remaining 2 time domain symbols in the slot 1 are used for transmitting a Demodulation Reference Signal (DMRS) or a Sounding Reference Signal (SRS).

Or, the first incomplete downlink channel may be transmitted on the remaining time domain resources of the m-th slot, as shown in FIG. 6, the remaining 2 time domain symbols in slot 1 are used for transmitting one incomplete downlink channel. It should be understood that the first incomplete downlink channel may be considered as the K+1-th downlink transmission channel, but the incomplete K+1-th downlink transmission channel is transmitted.

Scenario 3: when the remaining time domain resources of the slot are not sufficient to carry a complete downlink transmission channel, an incomplete n-th downlink transmission channel may be transmitted on the remaining time domain resources of the m-th slot. The following processing modes specifically exist:

Mode 1: the second communication unit 1101 is configured to directly transmit the incomplete n-th downlink transmission channel in the remaining time domain resources of the m-th slot when the remaining time domain resources of the m-th slot cannot carry the complete n-th downlink transmission channel.

That is, regardless of the quantity of time domain symbols contained in the remaining time domain resources, the n-th downlink transmission channel is transmitted on the remaining time domain resources.

At this time, the transmission times of the n-th downlink transmission channel may be counted into repeated times, for example, referring to FIG. 7, wherein, the incomplete n-th downlink transmission channel is transmitted once in the remaining 2 symbols of the slot 1 and counted into the repeated times, then the transmission is repeated 5 times in the slot 1 and 3 times in the slot 2.

Or, the transmission times of the n-th downlink transmission channel may be excluded from the repeated times, and at this time, the complete n-th downlink transmission channel will be transmitted again at the starting position of the m+1-th slot, and this transmission will be included in the repeated times. For example, referring to FIG. 8, if the incomplete n-th downlink transmission channel is transmitted in the remaining 2 symbols of the slot 1, and the repeated times are not counted, the transmission is repeated 4 times in the slot 1, and the incomplete downlink channel in the last transmission is not counted in the repeated times, and the transmission is repeated 4 times in the slot 2, for a total of 8 repeated transmission times.

Or, if the remaining time domain resources of the m-th slot meet the following conditions, the incomplete downlink transmission channel transmitted in the remaining time domain resources is counted into the repeated transmission times, otherwise it is not counted into the repeated transmission times. The condition that the transmission is counted may include: the quantity of all time domain symbols in the remaining time domain resources is greater than or equal to a first preset threshold; or, the quantity of time domain symbols used for transmitting data in the remaining time domain resources is greater than or equal to a second preset threshold.

Mode 2, the second communication unit 1101 is configured to transmit the incomplete n-th downlink transmission channel in the remaining time domain resources of the m-th slot when the remaining time domain resources of the m-th slot cannot carry the complete n-th downlink transmission channel and the remaining resources meet the second agreed condition.

In this mode, it may also include that the incomplete n-th downlink transmission channel is not transmitted on the remaining time domain resources of the m-th slot when the remaining time domain resources of the m-th slot cannot carry the complete n-th downlink transmission channel and the remaining resources do not meet the second agreed condition.

The second agreed condition is one of the following: the first agreed condition is not met; the quantity of time domain symbols of the remaining time domain resources is greater than or equal to a preset threshold; the quantity of time domain symbols used for transmitting data on the remaining time domain resources is greater than or equal to a preset threshold.

The first predetermined condition is that the quantity of time domain symbols of the remaining time domain resources is less than or equal to a preset threshold; or, the quantity of time domain symbols used for transmitting data in the remaining time domain resources is less than or equal to a preset threshold. Then, the second agreed condition is that the quantity of time domain symbols in the remaining time domain resources is greater than a preset threshold, or the quantity of time domain symbols used for transmission in the remaining time domain resources is greater than the preset threshold.

Further, the quantity of time domain symbols of the remaining time domain resources refers to the quantity of all time domain symbols remaining on the m-th slot after n−1 downlink transmission channels are transmitted on the m-th slot. When the quantity of all remaining symbols is greater than or equal to a preset threshold or greater than or equal to a preset threshold, it can be determined that it meets the second agreed condition.

The quantity of time-domain symbols used for transmitting data in the remaining time-domain resources refers to the quantity of remaining time-domain symbols used for transmitting data after removing the resources for transmitting reference signals or padding symbols from the total quantity of time domain symbols remaining in the m-th slot after n−1 downlink transmission channels are transmitted on the m-th slot. For example, the quantity of all remaining time-domain symbols is 2. After removing one symbol for transmitting the padding symbols, the remaining one symbol is the quantity of time domain symbols to which the transmission belongs, and when the quantity is greater than a preset threshold or when the quantity is greater than or equal to the preset threshold, it is determined that it meets the second agreed condition.

The preset threshold includes a first preset threshold and/or a second preset threshold. Specifically, the first preset threshold is a threshold determined based on the quantity of time domain symbols occupied by a complete downlink transmission channel; and/or the second preset threshold is a threshold determined based on the quantity of time domain symbols of transmission data contained in a complete downlink transmission channel.

The first preset threshold may be calculated according to the following formula: $\lceil N/2 \rceil$ or $\lceil 2 \cdot N/3 \rceil$, wherein N is the quantity of time domain symbols occupied by a complete downlink transmission channel and is an integer greater than or equal to 1. The first preset threshold may adopt other calculation methods in addition to the above calculation methods, or may be set to other values, and it is not exhaustive in this implementation.

The second preset threshold may be calculated according to the following formula: $\lceil L/2 \rceil$ or $\lceil 2 \cdot L/3 \rceil$, wherein L is the quantity of time domain symbols for transmitting data contained in a complete downlink transmission channel, such as the quantity of symbols remaining for transmitting data in a complete downlink transmission channel except symbols occupied by DMRS. The calculation method of the second preset threshold may adopt the above calculation method, and may be set to other values, and it is not exhaustive in this implementation.

In actual processing, the several scenarios may be combined for processing. For example, the first agreed condition and the second agreed condition may be used in combination or separately.

Specifically, the judgment and subsequent processing may only be implemented by adopting the first agreed condition. When the remaining time domain resources of the m-th slot cannot carry the complete n-th downlink transmission channel and the remaining resources meet the first agreed condition, the n-th downlink transmission channel is started to be transmitted at a starting position of the m+1-th slot; or, when the remaining time domain resources of the m-th slot cannot carry the complete n-th downlink transmission channel and the remaining resources do not meet the first agreed condition, the incomplete n-th downlink transmission channel is transmitted on the remaining time domain resources of the m-th slot.

The judgment and subsequent processing may only be implemented by adopting the second agreed condition: when the remaining time domain resources of the m-th slot cannot carry the complete n-th downlink transmission channel and the remaining resources meet the second agreed condition, the incomplete n-th downlink transmission channel is transmitted on the remaining time domain resources of the m-th slot; or, when the remaining time domain resources of the m-th slot cannot carry the complete n-th downlink transmission channel and the remaining resources do not meet the second agreed condition, the n-th downlink transmission channel is not transmitted on the remaining time domain resources of the m-th slot, and the n-th downlink transmission channel is started to be transmitted at a starting position of the m+1-th slot.

It is also possible to adopt comprehensive judgment and processing of the first agreed condition and the second agreed condition: when the remaining time domain resources of the m-th slot cannot carry the complete n-th downlink transmission channel and the remaining resources meet the first agreed condition, the n-th downlink transmission channel is started to be transmitted at the starting position of the m+1-th slot; at this time, the first incomplete downlink channel may be transmitted on the remaining resources of the m-th slot, or a reference signal or padding may be transmitted on the remaining resources of the m-th slot, or, when the remaining time domain resources of the m-th slot cannot carry the complete n-th downlink transmission channel and the remaining resources meet the second agreed condition, the incomplete n-th downlink transmission channel is transmitted on the remaining time domain resources of the m-th slot.

Finally, it should be pointed out that the processing of this implementation may be used in a grant free processing scenario.

It can be seen that by adopting the solution, it is determined how to repeatedly transmit target data through K transmission channels in continuous time domain resources of at least one continuous time sequence. By adopting the solution, the problem of increasing LBT opportunities caused by discontinuous transmission channels in time may be particularly avoided, thereby improving a success ratio of transmission.

Figure 12:
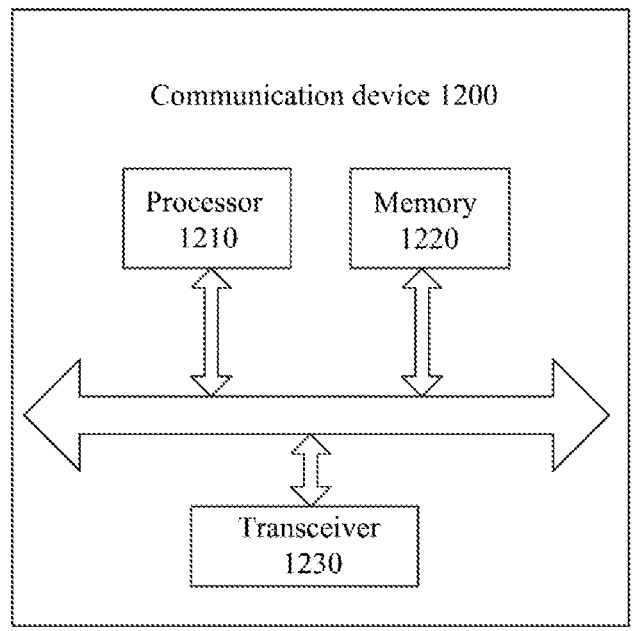
FIG. 12 is a schematic structural diagram of a communication device provided by an implementation of the present disclosure.

FIG. 12 is a schematic structural diagram of a communication device 1200 provided by an implementation of the present application. The communication device may be the terminal device or network device of the implementation. The communication device 1200 shown in FIG. 12 includes a processor 1210, the processor 1210 may call and run a computer program from a memory to implement the method in the implementation of the present application.

Optionally, as shown in FIG. 12, the communication device 1200 may further include a memory 1220. The processor 1210 may call and run a computer program from the memory 1220 to implement the method in the implementation of the present application.

The memory 1220 may be a separate device independent of the processor 1210 or may be integrated in the processor 1210.

Optionally, as shown in FIG. 12, the communication device 1200 may further include a transceiver 1230, and the processor 1210 may control the transceiver 1230 to communicate with other device, in particular, may send information or data to other device or receive information or data sent by other device.

The transceiver 1230 may include a transmitter and a receiver. The transceiver 1230 may further include an antenna, and the quantity of antenna may be one or more.

Optionally, the communication device 1200 may be a network device of the implementation of the present application, and the communication device 1200 may implement the corresponding flow implemented by the network device in various methods of the implementation of the present application, which will not be repeated here for brevity.

Optionally, the communication device 1200 may be a terminal device or a network device of the implementation of the present application, and the communication device 1200 may implement the corresponding processes implemented by the mobile terminal/terminal device in various methods of the implementation of the present application, which will not be repeated here for brevity.

Figure 13:
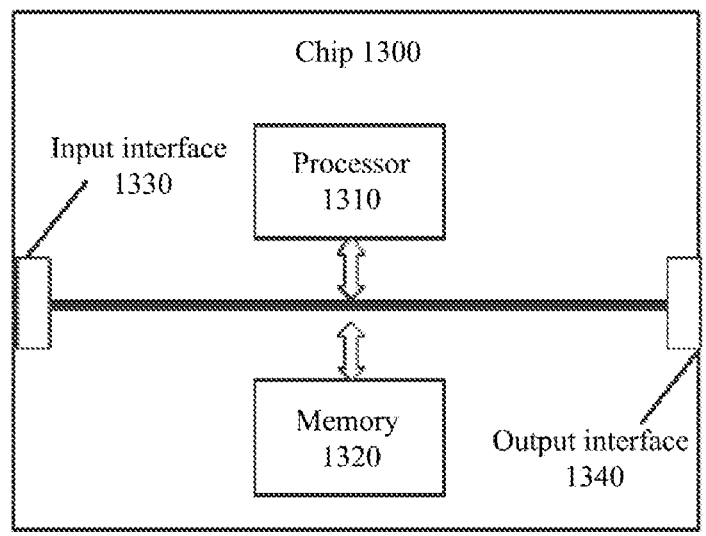
FIG. 13 is a schematic block diagram of a chip provided by an implementation of the present application.

FIG. 13 is a schematic structural diagram of a chip according to an implementation of the present application. The chip 1300 shown in FIG. 13 includes a processor 1310 that may call and run a computer program from a memory to implement the method in the implementation of the present application.

Optionally, as shown in FIG. 13, the chip 1300 may further include a memory 1320. The processor 1310 may call and run a computer program from the memory 1320 to implement the method in the implementation of the present application. The memory 1320 may be a separate device independent of the processor 1310 or may be integrated in the processor 1310.

Optionally, the chip 1300 may further include an input interface 1330. The processor 1310 may control the input interface 1330 to communicate with other device or chip. Specifically, the processor 1310 may acquire information or data sent by other device or chip.

Optionally, the chip 1300 may further include an output interface 1340. The processor 1310 may control the output interface 1340 to communicate with other device or chip, specifically, the processor 1310 may output information or data to other device or chip.

Optionally, the chip may be applied to the network device in an implementation of the present application, and the chip may implement the corresponding flow implemented by the network device in the various methods in the implementation of the present application, which will not be repeated here for the sake of brevity.

Optionally, the chip may be applied to the terminal device in the implementation of the present application, and the chip may implement the corresponding flow implemented by the terminal device in the various methods of the implementation of the present application, which will not be repeated here for the sake of brevity.

It should be understood that the chips mentioned in the implementations of the present application may also be referred to as a system-level chip, a system chip, a chip system or a system-on-chip chip, etc.

Figure 14:
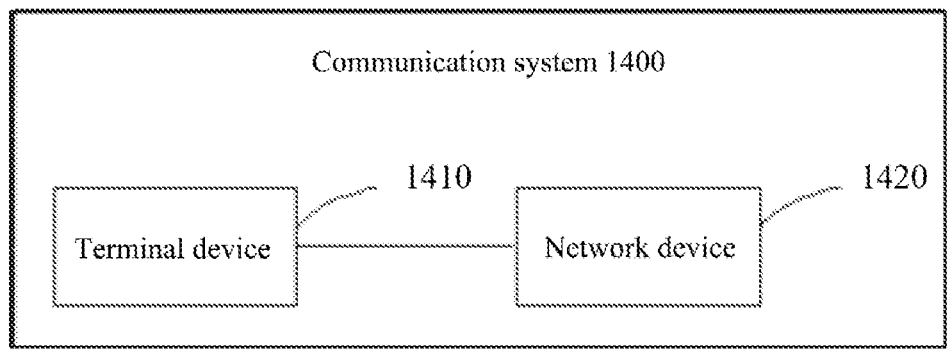
FIG. 14 is a second schematic diagram of architecture of a communication system provided by an implementation of the present application.

FIG. 14 is a schematic block diagram of a communication system 1400 provided by an implementation of the present application. As shown in FIG. 14, a communication system 1400 may include a terminal device 1410 and a network device 1420. Wherein, the terminal device 1410 may be used for implementing the corresponding functions implemented by the terminal device in the above-mentioned method, and the network device 1420 may be used for implementing the corresponding functions implemented by the network device in the above-mentioned method, which will not be repeated here for brevity.

It should be understood that the processor in an implementation of the present application may be an integrated circuit chip with a capability for processing signals. In a implementation process, the acts of the method implementations may be completed by integrated logic circuits of hardware in the processor or instructions in a form of software. The processor may be a general purpose processor, a digital signal processor (DSP), an application specific integrated circuit (ASIC), a field programmable gate array (FPGA), or another programmable logic device, a discrete gate or a transistor logic device, or a discrete hardware component. The processor may implement various methods, acts and logic block diagrams disclosed in the implementations of the present application. The general purpose processor may be a microprocessor or the processor may be any conventional processor or the like. The acts of the method disclosed in connection with the implementations of the present application may be directly embodied by execution of a hardware decoding processor, or by execution of a combination of hardware and software modules in a decoding processor. The software modules may be located in a storage medium commonly used in the art, such as a random access memory, flash memory, read-only memory, programmable read-only memory or electrically erasable programmable memory, or register. The storage medium is located in the memory, and the processor reads information in the memory and completes the acts of the method in combination with its hardware.

It should be understood that the memory in the implementations of the present application may be a transitory memory or a non-transitory memory, or may include both a transitory memory and a non-transitory memory. The non-transitory memory may be a read-only memory (ROM), a programmable ROM (PROM), an erasable programmable ROM (EPROM), an electrically erasable programmable ROM (EEPROM), or a flash memory. The transitory memory may be a random access memory (RAM) which serves as an external high-speed cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that memories of the systems and methods described herein are intended to include, but are not limited to, these and any other suitable types of memories.

It should be understood that, the memory is an example for illustration and should not be construed as limiting. For example, optionally, the memory in the implementations of the present disclosure may be a Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DR RAM), or the like. That is, memories in the systems and methods described herein are intended to include, but are not limited to, these and any other suitable types of memories.

An implementation of the present application further provides a computer-readable storage medium for storing a computer program.

Optionally, the computer readable storage medium may be applied to the network device in the implementations of the present application, and the computer program enables the computer to execute the corresponding processes implemented by the network device in the various methods of the implementations of the present application, which will not be repeated here for brevity.

Optionally, the computer readable storage medium may be applied to the terminal device in the implementations of the present application, and the computer program enables the computer to execute the corresponding processes implemented by the mobile terminal/terminal device in the various methods of the implementations of the present application, which will not be repeated here for brevity.

An implementation of the present disclosure also provides a computer program product including computer instructions.

Optionally, the computer program product may be applied to the network device in the implementations of the present application, and the computer program instructions enable the computer to execute the corresponding processes implemented by the network device in various methods of the implementations of the present application, which will not be repeated here for the sake of brevity.

Optionally, the computer program product may be applied to the mobile terminal/terminal device in the implementations of the present application, and the computer program instructions enable the computer to execute the corresponding processes implemented by the mobile terminal/terminal device in various methods of the implementations of the present application, which will not be repeated here for brevity.

An implementation of the present application also provides a computer program.

Optionally, the computer program may be applied to the network device in the implementations of the present application. When the computer program is run on the computer, the computer is enabled to execute the corresponding processes implemented by the network device in the various methods of the implementation of the present application. For the sake of brevity, the details will not be repeated here.

Optionally, the computer program may be applied to the mobile terminal/terminal device in the implementations of the present application. When the computer program is run on the computer, the computer is enabled to execute the corresponding processes implemented by the mobile terminal/terminal device in the various methods in the implementations of the present application. For the sake of brevity, it will not be repeated here.

Those of ordinary skill in the art will recognize that the exemplary units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present application.

Those skilled in the art may clearly understand that for convenience and conciseness of description, the specific working process of the system, apparatus and unit described above may refer to the corresponding process in the aforementioned implementations of methods, and details are not described herein again.

In several implementations provided by the present application, it should be understood that the disclosed systems, apparatuses and methods may be implemented in other ways. For example, the apparatus implementations described above are only illustrative, for another example, the division of the units is only a logical function division, and there may be other division manners in actual realization. For still another example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementations.

In addition, various functional units in various implementations of the present application may be integrated in one processing unit, or various units may be physically present separately, or two or more units may be integrated in one unit.

The foregoing are merely example implementations of the present application, but the protection scope of the present application is not limited thereto. Any person skilled in the art may easily conceive variations or substitutions within the technical scope disclosed by the present application, which should be included within the protection scope of the present application. Therefore, the protection scope of the present application should be subject to the protection scope of the claims.

What is claimed is:

1. A method for repeatedly transmitting information, comprising:
using, by a terminal device, remaining time domain symbols in one slot to transmit a Physical Uplink Shared Channel (PUSCH) carrying target data, wherein a quantity of the remaining time domain symbols is less than L, and transmitting, by the terminal device, a PUSCH repetition occupying L time domain symbols from the beginning of a next slot;
wherein the terminal device is configured to repeatedly transmit K PUSCH repetitions in continuous time domain symbols, and each repetition occupies L time domain symbols, wherein K is an integer greater than or equal to 2, and L is positive integer, and the one slot is one of multiple slots configured to transmit PUSCH repetitions carrying the target data, and time domain resources configured to transmit the PUSCH repetitions carrying the target data comprise the remaining time domain symbols,
wherein a quantity of actual PUSCH repetitions transmitted by the terminal device for carrying the target data is greater than the K, and the remaining time domain symbols in the one slot are continuous and comprise a last time domain symbol of the one slot, and the K PUSCH repetitions carry different transmission versions of the target data, and
wherein regardless of the quantity of the remaining time domain symbols in the one slot, the terminal device uses the remaining time domain symbols in the one slot to transmit the PUSCH carrying the target data.

2. The method of claim 1, wherein the quantity of the remaining time domain symbols is greater than or equal to a preset threshold.

3. The method of claim 2, wherein the preset threshold is determined based on calculation.

4. The method of claim 3, wherein the preset threshold is calculated according to the formula: $\lceil 2 \cdot M/3 \rceil$, wherein M is a quantity of remaining symbols for transmitting data in a complete PUSCH except symbols occupied by a Demodulation Reference Signal (DMRS).

5. A method for repeatedly transmitting information, comprising:
using, by a network device, remaining time domain symbols in one slot to transmit a Physical Downlink Shared Channel (PDSCH) carrying target data, wherein a quantity of the remaining time domain symbols is less than L, and transmitting, by the network device, a PDSCH repetition occupying L time domain symbols from the beginning of a next slot;
wherein the network device is configured to repeatedly transmit K PDSCH repetitions in continuous time domain symbols, and each repetition occupies L time domain symbols, wherein K is an integer greater than or equal to 2, and L is positive integer, and the one slot is one of multiple slots configured to transmit PDSCH repetitions carrying the target data, and time domain resources configured to transmit the PDSCH repetitions carrying the target data comprise the remaining time domain symbols,
wherein a quantity of actual PDSCH repetitions transmitted by the network device for carrying the target data is greater than the K, and the remaining time domain symbols in the one slot are continuous and comprise a last time domain symbol of the one slot, and the K PDSCH repetitions carry different transmission versions of the target data, and
wherein regardless of the quantity of the remaining time domain symbols in the one slot, the network device uses the remaining time domain symbols in the one slot to transmit the PDSCH carrying the target data.

6. The method of claim 5, wherein the quantity of the remaining time domain symbols is greater than or equal to a preset threshold.

7. The method of claim 6, wherein the preset threshold is determined based on calculation.

8. The method of claim 7, wherein the preset threshold is calculated according to the formula: $\lceil 2 \cdot M/3 \rceil$, wherein M is a quantity of remaining symbols for transmitting data in a complete PDSCH except symbols occupied by a Demodulation Reference Signal (DMRS).

9. A network device, comprising:
a transceiver, configured to use remaining time domain symbols in one slot to transmit a Physical Downlink Shared Channel (PDSCH) carrying target data, wherein a quantity of the remaining time domain symbols is less than L, and to transmit a PDSCH repetition occupying L time domain symbols from the beginning of a next slot;
wherein the transceiver is further configured to repeatedly transmit K PDSCH repetitions in continuous time domain symbols, wherein each repetition occupies L time domain symbols, wherein K is an integer greater than or equal to 2, and L is positive integer, and the one slot is one of multiple slots configured to transmit PDSCH repetitions carrying the target data, and time domain resources configured to transmit the PDSCH repetitions carrying the target data comprise the remaining time domain symbols,
wherein a quantity of actual PDSCH repetitions transmitted by the network device for carrying the target data is greater than the K, and the remaining time domain symbols in the one slot are continuous and comprise a last time domain symbol of the one slot, and the K PDSCH repetitions carry different transmission versions of the target data, and
wherein the transceiver is configured to, regardless of the quantity of the remaining time domain symbols in the one slot, use the remaining time domain symbols in the one slot to transmit the PDSCH carrying the target data.

10. The network device of claim 9, wherein the quantity of the remaining time domain symbols is greater than or equal to a preset threshold.

11. The network device of claim 10, wherein the preset threshold is determined based on calculation.

12. The network device of claim 11, wherein the preset threshold is calculated according to the formula: $\lceil 2 \cdot M/3 \rceil$, wherein M is a quantity of remaining symbols for transmitting data in a complete PDSCH except symbols occupied by a Demodulation Reference Signal (DMRS).

* * * * *